(12) United States Patent
Kasatani

(10) Patent No.: US 7,836,158 B2
(45) Date of Patent: Nov. 16, 2010

(54) NETWORK SYNCHRONIZATION SYSTEM AND INFORMATION PROCESSING DEVICE

(75) Inventor: Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 191 days.

(21) Appl. No.: 12/153,951

(22) Filed: May 28, 2008

(65) Prior Publication Data

US 2009/0006652 A1    Jan. 1, 2009

(30) Foreign Application Priority Data

Jun. 27, 2007  (JP) ............................. 2007-169792
Mar. 17, 2008  (JP) ............................. 2008-068454

(51) Int. Cl.
  *G06F 17/30* (2006.01)
(52) U.S. Cl. ....................... 709/220; 709/224; 709/226
(58) Field of Classification Search ................ 709/220, 709/225, 229, 224, 226, 228
  See application file for complete search history.

(56) References Cited

U.S. PATENT DOCUMENTS

| | | | |
|---|---|---|---|
| 7,145,450 B2 * | 12/2006 | Brown | 340/506 |
| 7,194,503 B2 * | 3/2007 | Shell et al. | 709/202 |
| 7,194,526 B2 * | 3/2007 | Kanemitsu | 709/220 |
| 2007/0050460 A1 | 3/2007 | Kasatani | |
| 2007/0130223 A1 * | 6/2007 | Savilampi et al. | 707/203 |
| 2008/0208908 A1 * | 8/2008 | Kashyap et al. | 707/104.1 |

FOREIGN PATENT DOCUMENTS

| | | |
|---|---|---|
| JP | 2004-356822 | 12/2004 |
| JP | 2007-067830 | 3/2007 |

* cited by examiner

*Primary Examiner*—Khanh Q Dinh
(74) *Attorney, Agent, or Firm*—Harness, Dickey & Pierce, P.L.C.

(57) ABSTRACT

A disclosed network synchronization system includes plural information processing devices. At least one of the information processing devices includes a setting information storage unit configured to store a setting information piece of the information processing device, a synchronous shared-storage unit configured to duplicate the setting information piece of the information processing device stored in the setting information storage unit and store the duplicated setting information piece of the information processing device such that the duplicated setting information piece of the information processing device is shared by another of the information processing devices, and a synchronization control unit configured to update the setting information piece of the information processing device stored in the setting information storage unit based on the setting information piece stored in the synchronous shared-storage unit.

15 Claims, 21 Drawing Sheets

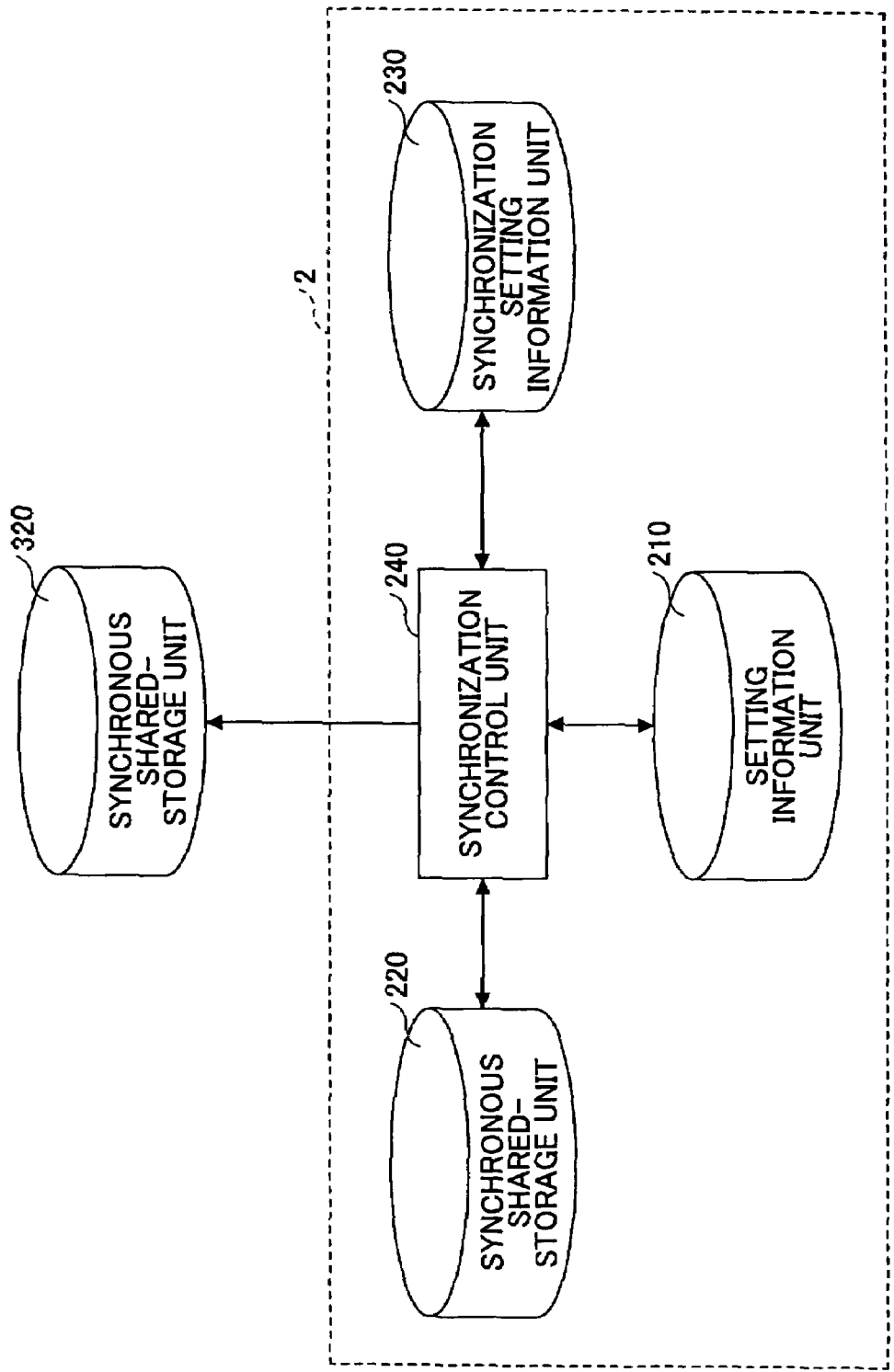

FIG.3A

AUTHENTICATION REFERENCE INFORMATION

| | IC CARD | FIRST EXTERNAL DEVICE USER NAME | FIRST EXTERNAL DEVICE PASSWORD | SECOND EXTERNAL DEVICE USER NAME | SECOND EXTERNAL DEVICE PASSWORD | PERSONAL MENU AUTHENTICATION USER NAME | PERSONAL MENU AUTHENTICATION PASSWORD |
|---|---|---|---|---|---|---|---|
| A | A | AAA | **** | ABC | ○○○○ | ABD | ×××× |
| B | | | | | | | |
| C | | | | | | | |
| D | | | | | | | |

FIG.3B

PERSONAL SETTING INFORMATION

<PERSONAL SETTING TABLE: USER A>
(1) NAME (IN HIRAGANA): りこうたろう
(2) NAME (IN KANJI): 理光太郎
(3) DIVISION: DEVELOPMENT PROJECT DEPARTMENT
(4) PERSONAL MENU REFERENCE INFORMATION
(5) FIRST EXTERNAL DEVICE AUTHENTICATION INFORMATION
(6) SECOND EXTERNAL DEVICE AUTHENTICATION INFORMATION
(7) AUTOMATICALLY ERASE PERSONAL MENU
(8) PERSONAL MENU AUTOMATIC ERASURE SETTING STORING REGION: AUTOMATIC ERASURE=YES, STORE FOR = 3 DAYS
(9) FUNCTION RESTRICTION INFORMATION
(10) REGISTERED DESTINATION INFORMATION: NAME = HOME DIRECTORY, NETWORK PATH = YES
(11) SHARED-MEDIUM INFORMATION : NAME = HOME DIRECTORY, REGISTERED DESTINATION = HOME DIRECTORY
(12) THE LATEST USAGE STORING REGION

FIG.4

NETWORK SYNCHRONIZATION SETTING INFORMATION

```
<NETWORK SYNCHRONIZATION SETTING TABLE>
(1) AUTOMATIC NETWORK SYNCHRONIZATION: YES
(2) PUBLISH SYNCHRONOUS SHARED FOLDER: YES
(3) NETWORK PATH: FEEDBACK
(4) LOGIN USER NAME: FEEDBACK
(5) LOGIN PASSWORD: FEEDBACK
(6) AUTOMATIC SYNCHRONIZATION INTERVAL: 10 MINUTES
(7) MANUAL SYNCHRONIZATION: YES
```

FIG.11A

AUTHENTICATION SETTING INFORMATION

<AUTHENTICATION SETTING TABLE>
(1) FIRST AUTHENTICATION: NETWORK AUTHENTICATION
(2) SECOND AUTHENTICATION: IC CARD AUTHENTICATION
(3) LOGIN ONLY WITH PERSONAL MENU AUTHENTICATION IN THE CASE OF CONNECTION FAILURE TO EXTERNAL DEVICE: NO

FIG.11B

NETWORK AUTHENTICATION SETTING INFORMATION

<FIRST EXTERNAL DEVICE AUTHENTICATION SETTING TABLE>
(1) SERVER TYPE: AD
(2) DOMAIN NAME: ○○○○
(3) IDENTIFICATION NAME (AD ONLY): △△△△
(4) FIRST EXTERNAL DEVICE ADDRESS: ××××
(5) LINK WITH PERSONAL MENU AUTHENTICATION
 (a) AUTOMATICALLY REGISTER PERSONAL MENU (FIRST AUTHENTICATION ONLY): NO
 (b) AUTOMATICALLY UPDATE PASSWORD (FIRST AUTHENTICATION ONLY): NO
 (c) AUTOMATICALLY UPDATE PERSONAL INFORMATION (SECOND AUTHENTICATION ONLY): NO
(6) AUTOMATICALLY REGISTER/UPDATE HOME DIRECTORY: NO

FIG.11C

IC CARD AUTHENTICATION SETTING INFORMATION

<IC CARD AUTHENTICATION SETTING TABLE>
(1) LINK WITH PERSONAL MENU AUTHENTICATION
  (a) AUTOMATICALLY REGISTER PERSONAL MENU (FIRST AUTHENTICATION ONLY): NO
  (b) AUTOMATICALLY REGISTER IC CARD (FIRST AUTHENTICATION ONLY): NO
(2) USE USER NAME/PASSWORD AUTHENTICATION IN COMBINATION: YES
(3) LIMIT TO USER WITH UNREGISTERED IC CARD: YES

FIG.12A

AUTHENTICATION REFERENCE INFORMATION

| | IC CARD | FIRST EXTERNAL DEVICE | FIRST EXTERNAL DEVICE | SECOND EXTERNAL DEVICE | SECOND EXTERNAL DEVICE | PERSONAL MENU AUTHENTICATION | PERSONAL MENU AUTHENTICATION |
|---|---|---|---|---|---|---|---|
| | | USER NAME | PASSWORD | USER NAME | PASSWORD | USER NAME | PASSWORD |
| A | A | AAA | ***** | ABC | OOOO | ABD | ×××× |
| B | | | | | | | |
| C | | | | | | | |
| D | | | | | | | |

FIG.12B

PERSONAL SETTING INFORMATION

<PERSONAL SETTING TABLE: USER A>
(1) NAME (IN HIRAGANA): りこうたろう
(2) NAME (IN KANJI): 理光太郎
(3) DIVISION: DEVELOPMENT PROJECT DEPARTMENT
(4) PERSONAL MENU REFERENCE INFORMATION
(5) FIRST EXTERNAL DEVICE AUTHENTICATION INFORMATION
(6) SECOND EXTERNAL DEVICE AUTHENTICATION INFORMATION
(7) AUTOMATICALLY ERASE PERSONAL MENU
(8) PERSONAL MENU AUTOMATIC ERASURE SETTING STORING REGION: AUTOMATIC ERASURE=YES, STORE FOR = 3 DAYS
(9) FUNCTION RESTRICTION INFORMATION
(10) REGISTERED DESTINATION INFORMATION: NAME = HOME DIRECTORY, NETWORK PATH = YES
(11) SHARED-MEDIUM INFORMATION : NAME = HOME DIRECTORY, REGISTERED DESTINATION = HOME DIRECTORY
(12) THE LATEST USAGE STORING REGION

FIG.13

NETWORK SYNCHRONIZATION SETTING INFORMATION

```
<NETWORK SYNCHRONIZATION SETTING TABLE>
(1) AUTOMATIC NETWORK SYNCHRONIZATION: YES
(2) PUBLISH SYNCHRONOUS SHARED FOLDER: YES
(3) NETWORK PATH: FEEDBACK
(4) LOGIN USER NAME: FEEDBACK
(5) LOGIN PASSWORD: FEEDBACK
(6) AUTOMATIC SYNCHRONIZATION INTERVAL: 10 MINUTES
(7) MANUAL SYNCHRONIZATION: YES
```

NETWORK SYNCHRONIZATION SYSTEM AND INFORMATION PROCESSING DEVICE

BACKGROUND OF THE INVENTION

1. Field of the Invention

The present invention relates to a network synchronization system and an information processing device.

2. Description of the Related Art

Recently, information processing systems have been developed which include an information processing device connected to a network and capable of transmitting documents in various data formats among plural information devices using plural communication protocols.

In such an information processing system, various application services are provided using the information processing device as a core. Examples of application services include, transmitting a scanned image or data created by an information device to a specified destination by electronic mail or facsimile; transferring a file among information devices; recording and outputting the body of a received e-mail message and an image in an attached file or transferring them to a specified facsimile machine; and storing and managing data in the device.

Such an information processing device, however, needs to be connected to plural information devices via a network. Especially, in the case where plural devices that require authentication are independently present on the network, entry of user name and password is required in each device which provides functions that can be used only by a person identified as a registered user, which is troublesome for users. If the system is integrated, single user name and password set can be used. However, a huge cost must be borne to construct such a system for centrally managing authentication information pieces that have been managed independently.

Japanese Patent Laid-Open Publication No. 2007-67830 (Patent Document 1) discloses a network communication system that solves the above-described problem. This network communication system includes a document input/output device and plural external devices connected to the document input/output device. The document input/output device identifies a person by authentication performed using an operations unit and provides functions that can be used only by a registered user. The external devices identify a person according to protocols on the network and provide functions.

According to Patent Document 1, the document input/output device performs one authentication operation using the operations unit to cause external devices to automatically perform authentication operations using their individual authentication units.

Suppose that a network communication system including plural information processing devices such as the document input/output device of Patent Document 1 is constructed. If, for example, the information processing devices of the network communication system are shared by members of a certain division of a company, it is preferable to share (synchronize), among plural information processing devices, setting information such as user information registered in each of the information processing devices.

However, a large cost must be borne to construct such a system that, for example, centrally manages setting information stored in each device to achieve synchronization of setting information.

SUMMARY OF THE INVENTION

In view of the foregoing, the present invention is directed to provide a network synchronization system and an information processing device that effectively achieve synchronization of setting information among plural information processing devices.

In an embodiment of the present invention, there is provided a network synchronization system that includes plural information processing devices. At least one of the information processing devices includes a setting information storage unit configured to store a setting information piece of the information processing device, a synchronous shared-storage unit configured to duplicate the setting information piece of the information processing device stored in the setting information storage unit and store the duplicated setting information piece of the information processing device such that the duplicated setting information piece of the information processing device is shared by another of the information processing devices, and a synchronization control unit configured to update the setting information piece of the information processing device stored in the setting information storage unit based on the setting information piece stored in the synchronous shared-storage unit.

In another embodiment of the present invention, there is provided an information processing device of a network synchronization system, which network synchronization system includes plural of the information processing devices. The information processing device includes a setting information storage unit configured to store a setting information piece of the information processing device, a synchronous shared-storage unit configured to duplicate the setting information piece of the information processing device stored in the setting information storage unit and store the duplicated setting information piece of the information processing device such that the duplicated setting information piece of the information processing device is shared by another of the information processing devices, and a synchronization control unit configured to update the setting information piece of the information processing device stored in the setting information storage unit based on the setting information piece stored in the synchronous shared-storage unit.

According to an aspect of the present invention, it is possible to provide a network synchronization system and an information processing device that effectively achieve synchronization of setting information among plural information processing devices.

BRIEF DESCRIPTION OF THE DRAWINGS

FIG. 2 is a block diagram illustrating the functional configuration of a digital color multifunction printer according to the first embodiment;

FIGS. 3A and 3B are drawings each showing an example of a setting information piece stored in a setting information unit;

FIG. 4 is a drawing showing an example of a synchronization setting information piece stored in a synchronization setting information unit;

FIGS. 11A-11C are drawings each showing an example of an authentication setting information piece stored in an authentication setting information unit;

FIGS. 12A and 12B are drawings each showing an example of a personal setting information piece stored in a personal setting information unit;

FIG. 13 is a drawing showing an example of a synchronization setting information piece stored in a synchronization setting information unit;

DETAILED DESCRIPTION OF THE PREFERRED EMBODIMENT

Preferred embodiments of the present invention are described below with reference to the accompanying drawings. In the following description, an information processing device of an embodiment of the present invention is applied to a so-called digital color multifunction printer (MFP) which provides multiple functions including a copier function, a facsimile function, a printer function, a scanner function, and a function for delivering an input image (an image scanned by the scanner function or an image input by the printer function or the facsimile function). The present invention is not limited to the MFPs. The present invention is equally applicable to other devices such as general-purpose computers.

First Embodiment

A first embodiment of the present invention is described below with reference to FIGS. 1-6.

(Exemplary System Configuration)

Figure 1:
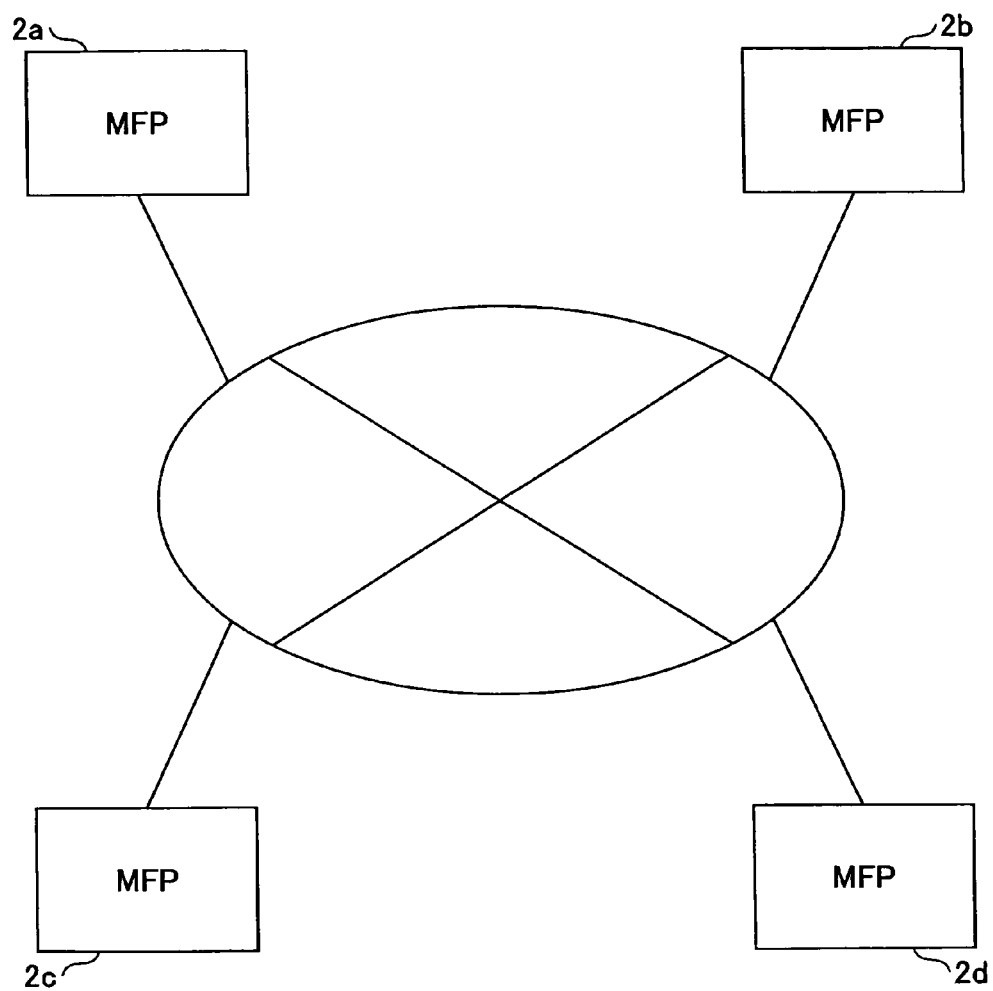
FIG. 1 is a schematic diagram illustrating an exemplary configuration of a network synchronization system including digital color multifunction printers according to a first embodiment.

FIG. 1 is a schematic diagram illustrating an exemplary configuration of a network synchronization system 1 including digital color multifunction printers (MFPs) 2a, 2b, 2c, and 2d according to a first embodiment. In FIG. 1, the network synchronization system 1 includes the plural MFPs 2a, 2b, 2c, and 2d (hereinafter also referred to as MFPs 2) connected to each other via a network such as a LAN (Local Area Network).

As mentioned above, each of the MFPs 2 is an image processing device which provides multiple functions including a copier function, a facsimile function, a printer function, a scanner function, and a function for delivering an input image (an image scanned by the scanner function or an image input by the printer function or the facsimile function).

With the above-described system configuration, the network synchronization system 1 of the first embodiment effectively synchronizes, among the plural MFPs 2, setting information pieces of the respective MFPs 2. The functional configuration is described below in greater detail.

(Exemplary Functional Configuration)

FIG. 2 is a block diagram illustrating the functional configuration of the MFP 2 according to the first embodiment. In FIG. 2, the MFP 2 includes a setting information unit 210, a synchronous shared-storage unit 220, a synchronization setting information unit 230, and a synchronization control unit 240.

The setting information unit 210 stores a setting information piece of the MFP 2. The setting information piece includes a common setting information piece and a specific setting information piece. The common setting information piece includes a personal setting information piece of each user which can be used in another MFP 2 different from the current MFP 2. The specific setting information piece includes a device-specific information piece that cannot be used in another MFP 2. Examples of the common setting information piece and the specific setting information piece are described below with reference to FIGS. 3A and 3B.

The synchronous shared-storage unit 220 stores information for performing synchronization among the plural MFPs 2. The information to be stored in the synchronous shared-storage unit 220 includes the common setting information piece stored in the setting information unit 210, for example. If the synchronous shared-storage unit 220 is set to be public in the setting related to synchronization by the below-described synchronization setting information unit 230, another MFP 2 can access the synchronous shared-storage unit 220 of the current MFP 2.

The synchronization setting information unit 230 stores a setting information piece related to synchronization of the plural MFPs 2. An example of the synchronization setting information piece is described below with reference to FIG. 4. The synchronization control unit 240 performs various control operations related to synchronization of the plural MFPs 2. Examples of control operations are described below with reference to FIGS. 5 and 6.

With the above-described functional configuration, the network synchronization system 1 of the first embodiment effectively synchronizes, among the plural MFPs 2, setting information pieces of the respective MFPs 2.

(Examples of Setting Information Pieces)

FIGS. 3A and 3B are drawings each showing an example of a setting information piece stored in the setting information unit 210. As mentioned above, the setting information piece stored in the setting information unit 210 includes a common setting information piece that can be used in another MFP 2 and a specific setting information piece that cannot be used in another MFP 2.

As examples of common setting information pieces, FIG. 3A shows an authentication reference information piece (system setting file) and FIG. 3B shows a personal setting information piece (personal setting file). The authentication reference information piece includes a reference information piece for authentication of registered users allowed to use the current MFP 2. The personal setting information piece includes a setting information piece of each of the registered users allowed to use the current MFP 2. The number of the personal setting information pieces of FIG. 3B corresponds to the number of the registered users (which may be one or more). Although these information pieces are not described in detail herein, the authentication reference information piece of FIG. 3A may be regarded as being included in the personal setting information piece in the sense that the authentication reference information piece includes a setting information piece of each registered user allowed to use the MFP 2.

These setting information pieces are stored in the setting information unit 210. The setting information pieces stored in the setting information unit 210 are not limited to the information pieces shown in FIGS. 3A and 3B. For example, the setting information pieces stored in the setting information unit 210 may include a guest setting information piece for a user who uses the current MFP 2 as a guest user and a group setting information piece for a user who uses the current MFP 2 as a group member.

(Example of Synchronization Setting Information Piece)

FIG. 4 is a drawing showing an example of a synchronization setting information piece stored in the synchronization setting information unit 230. The example of synchronization setting information piece of FIG. 4 stored in the synchronization setting information unit 230 includes the following items: "automatic network synchronization", "publish synchronous shared folder", "network path", "login user name", "login password", "automatic synchronization interval (10 minutes-9999 minutes)", and "manual synchronization". These setting items are described below in greater detail.

The setting item "automatic network synchronization" specifies setting information indicating whether the current MFP 2 performs automatic network synchronization according to this embodiment.

The setting item "publish synchronous shared folder (synchronous shared-storage unit)" specifies setting information indicating whether to publish the synchronous shared-storage unit 220 as a synchronous shared folder of the MFP 2. If the synchronous shared-storage unit 220 is specified to be public, another MFP 2 can access the synchronous shared-storage unit 220 of the current MFP 2. The setting item "network path" indicates the location of a synchronous shared folder (e.g., synchronous shared-storage unit 320) of another MFP 2. The synchronization control unit 240 locates a synchronous shared folder (e.g., synchronous shared-storage unit 320) of another MFP 2 as a destination device using this network path.

The setting items "login user name" and "login password" indicate a user name and a password, respectively, for logging into the current MFP 2. If the synchronous shared-storage unit 220 is specified to be public in the item "publish synchronous shared folder", another MFP 2 can access the synchronous shared-storage unit 220 of the current MFP 2 based on these login information pieces.

The setting item "automatic synchronization interval (10 minutes-9999 minutes)" specifies setting information indicating the interval between synchronizations for synchronizing the current MFP 2 with another MFP 2. A user can specify the interval between automatic synchronizations. It is to be noted that, in order to distribute the network workload, probability using random numbers may be calculated based on the device unique number and the current time such that the time to perform the next synchronization is determined based on the calculated synchronization interval X probability.

The setting item "manual synchronization" specifies setting information indicating whether to allow manual synchronization of the current MFP 2 with another MFP 2. If "yes" is selected as the setting information, execution of manual synchronization is allowed.

With the above-described synchronization setting information piece of FIG. 4, settings related to whether to publish the synchronous shared folder (synchronous shared-storage unit), network path, login user name, login password, automatic synchronization interval, and manual synchronization can be specified.

(Overview of Synchronization Operation)

Figure 5:
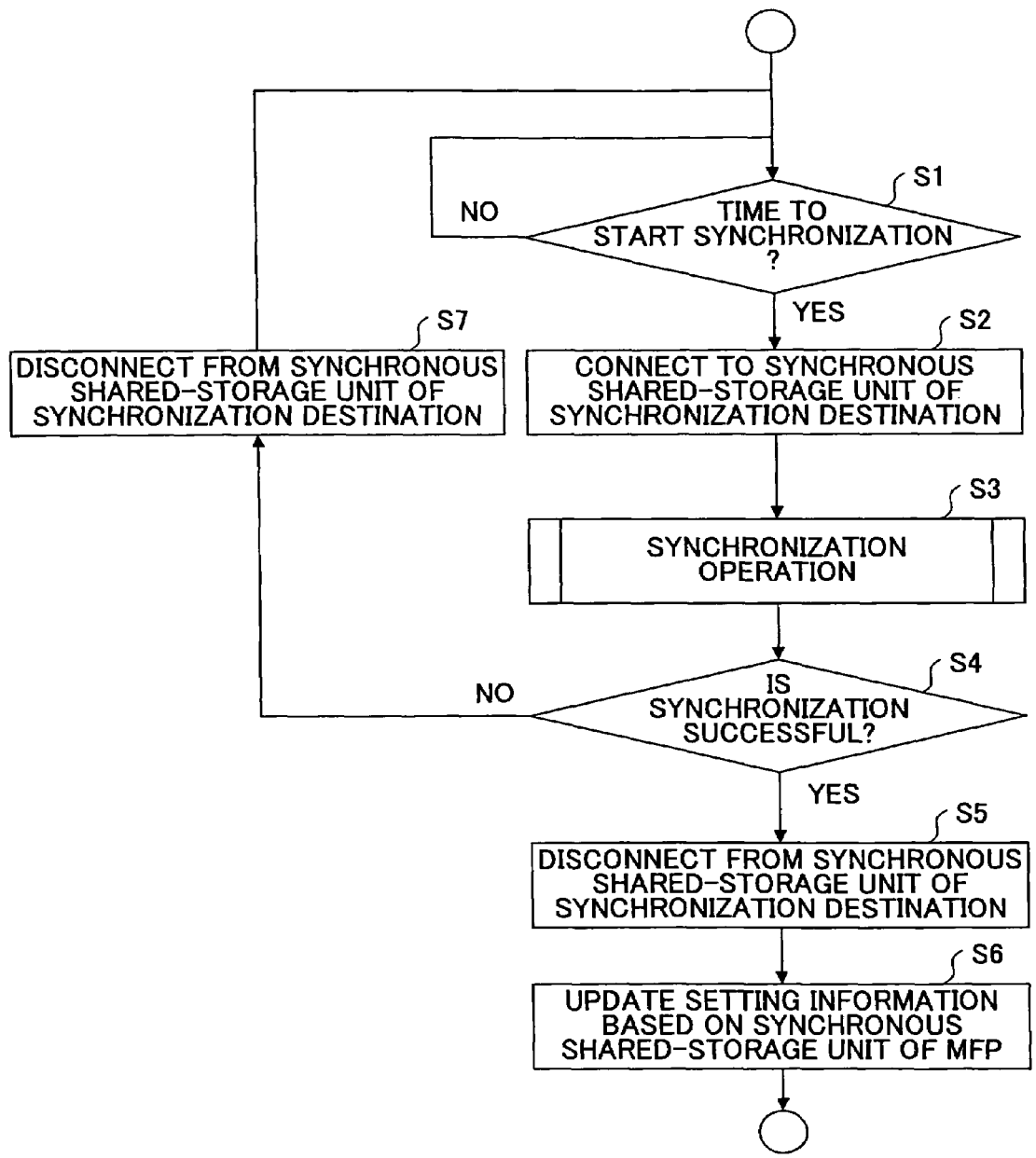
FIG. 5 is a general flowchart illustrating a synchronization operation performed by a digital color multifunction printer according to the first embodiment.

FIG. 5 is a general flowchart illustrating a synchronization operation performed by an MFP 2a according to the first embodiment. The following describes the overview of an operation performed by the current MFP 2a for synchronizing setting information pieces with another MFP 2b with reference to FIG. 5.

In the MFPs 2a and 2b, copies of setting information pieces related to the MFPs 2a and 2b are previously generated in their synchronization shared-storage unit 220 and 320 (see FIG. 2), respectively. In the MFP 2b, "yes" is previously selected for the item "publish the synchronous shared folder". Accordingly, the MFP 2a can access to the synchronous shared-storage unit 320 of the MFP 2b.

First, the MFP 2a determines whether it is time to start synchronization (Step S1). In this step, for example, the synchronization control unit 240 makes a determination based on the setting information in the item "automatic synchronization interval" in the synchronization setting information unit 230. If it is determined to be time to start synchronization (Yes in Step S1), the process proceeds to Step S2. If it is determined not to be time to start synchronization (No in Step S1), the process returns to Step S1 and repeats Step S1.

In Step S2, the MFP 2a connects to the synchronous shared-storage unit (synchronous shared folder) of the MFP 2b as the synchronization destination. In this step, for example, the synchronization control unit 240 connects to the synchronous shared-storage unit 320 as the synchronous shared folder of the MFP 2b.

Then in Step S3, the MFP 2a performs a synchronization operation with the MFP 2b as the synchronization target (Step S3). With the operation of Step S3, the setting information piece stored in the synchronous shared-storage unit 220 of the MFP 2a is updated based on the setting information piece stored in the synchronous shared-storage unit 320 of the MFP 2b. The operation of Step S3 is described below in greater detail with reference to FIG. 6.

When the synchronization operation of Step S3 is completed, the process proceeds to Step S4 in which the MFP 2a determines whether the synchronization has succeeded (Step S4). If the synchronous operation has succeeded (Yes in Step S4), the process proceeds to Step S5. If the synchronous operation has failed (No in Step S4), the process proceeds to Step S7.

In Step S5, the MFP 2a disconnects from the synchronous shared-storage unit 320 of the synchronization destination to which connection is established in Step S2. In this step the synchronization control unit 240 disconnects from the synchronous shared-storage unit 320.

The process proceeds from Step S5 to Step S6 in which the MFP 2a updates the setting information piece based on the synchronous shared-storage unit 220 of the MFP 2a (Step S6). In this step the synchronization control unit 240 updates the setting information piece in the setting information unit 210 based on the setting information piece, which has been updated by the operation of Step S5, in the synchronous shared-storage unit 220. When the operation of Step S6 is completed, the process returns to Step S1.

In Step S7, the MFP 2a disconnects from the synchronous shared-storage unit 320 of the synchronization destination to which connection is established in Step S2 and returns to Step S1.

With the above-described process, the MFP 2a synchronizes the setting information piece with another MFP 2 such as the MFP 2b. In this way, it is possible to effectively achieve synchronization of setting information pieces between plural information processing devices.

(Exemplary Synchronization Operation)

Figure 6:
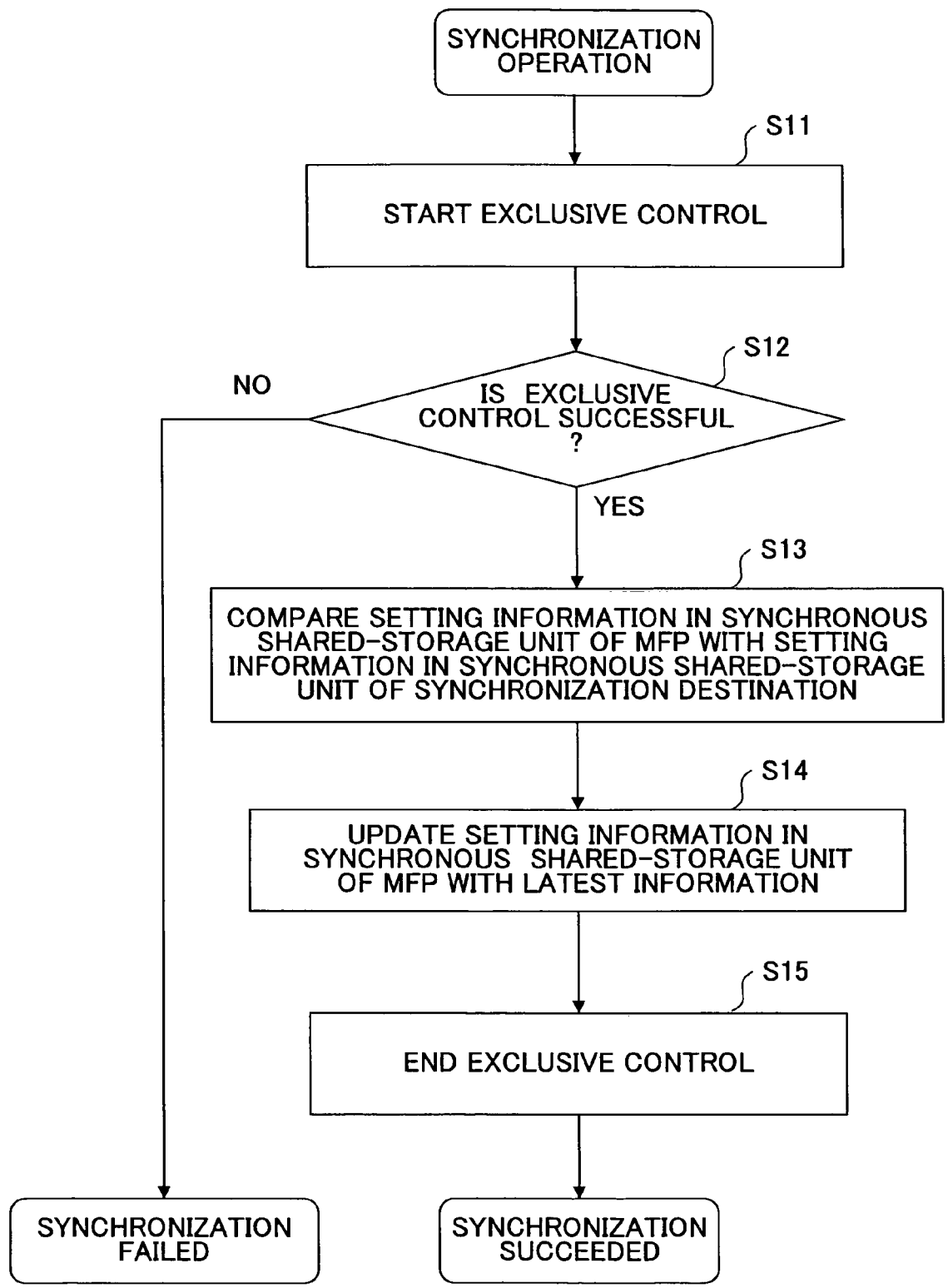
FIG. 6 is a flowchart illustrating an exemplary synchronization operation performed by a digital color multifunction printer according to the first embodiment.

FIG. 6 is a flowchart illustrating an exemplary synchronization operation performed by the MFP 2a according to the first embodiment. The following describes the details of the operation of Step S5 of FIG. 5, i.e., the operation performed by the MFP 2a, which is connected to the MFP 2b, for synchronizing the setting information piece with the MFP 2b with reference to FIG. 6.

First, the MFP 2a starts exclusive control (Step S11). In this Step the synchronization control unit 240 creates, for example, a directory for exclusive control. That is, before starting synchronization, a directory is created in the synchronous shared-storage unit 320 of the synchronization destination. It is to be noted that only a device who has succeeded in creating a directory obtains permission to use the synchronous shared-storage unit 320.

The process proceeds to Step S12 in which the MFP 2a determines whether the exclusive control is successful. If the exclusive control is successful (Yes in Step S12), the process proceeds to Step S13. If the exclusive control has failed (No in Step S12), synchronization fails, so that the operation ends with the synchronization failure.

In Step S13, the MFP 2a compares the setting information piece in the synchronous shared-storage unit 220 of the MFP 2a with the setting information piece in the synchronous shared-storage unit 320 of the synchronization destination (Step S13). Then in Step S14 the MFP 2a updates the setting information piece in the synchronous shared-storage unit 220 with the latest information (S14).

In Step S14, after the comparison in Step S13, the setting information piece stored in the synchronous shared-storage unit 220 is updated with the latest information and converted. Each of the synchronous shared-storage units 220 and 320 stores, together with the setting information piece, a catalog file for managing registered users, group IDs, the last updated date, and the date deleted. Using the catalog file, files are duplicated or deleted, thereby maintaining the file with the most recent last updated date and deleted date. Finally, the catalog file is updated. The synchronous shared-storage unit 220 stores the above-described authentication reference information piece (system setting file) and the personal setting information piece (personal setting file), the group setting information piece, the catalog file, etc.

When in Step S14, regarding updating and converting the setting information piece stored in the synchronous shared-storage unit 220, setting information pieces of an identical user (or group) are modified to have the same ID. More specifically, an ID that is unique among all the MFPs 2 is previously assigned to each user (or group). When comparing the setting information pieces of users (or groups) in Step S13, users (or groups) having the same ID or having different IDs but the same user name (or group name) are identified as an identical user (or group), and the setting information piece having the more recent latest updated date is selected. If users (groups) having the same ID are present, in case there is another user (or another group) having the same user name (or group name) as but an ID different ID from that of the former users, the user name (or group name) of the latter user having the different ID is changed to a different name by adding a predetermined character string ("_n" (n is a number)) at the end of the name.

When the operation of Step S14 is completed, the process proceeds to Step S15 in which the exclusive control started in Step S11 is ended (Step S15). In this step, the synchronization control unit 240 ends the exclusive control by, for example, deleting the directory created in Step S11. The synchronization has succeeded, and therefore the operation ends with the successful synchronization.

With the above-described process, the MFP 2a synchronizes the setting information piece with another MFP 2 such as the MFP 2b.

In an alternative embodiment, the synchronous shared-storage unit 220 may include two HDD segments of the same format for storing setting information pieces. One of the HDD segments is configured to store a setting information piece currently in use, while the other one of the HDD segments is configured to store a setting information piece after the next synchronization. With this configuration, the synchronization result can be instantly reflected by switching the HDD segment currently in use after completion of synchronization.

An MFP 2 that is newly connected to the network synchronization system 1 may perform synchronization with another MFP 2 while treating all the setting information pieces stored in the newly connected MFP 2 as being older. In this case, if a new MFP 2 is added to the network synchronization system 1, the new MFP 2 can receive all the setting information pieces of another MFP 2.

According to the network synchronization system 1 and the MFP 2 of the above-described first embodiment, it is possible to perform synchronization between the MFP 2 and another MFP connected thereto via a network without using a device such as a server device. This is achieved by maintaining the latest setting information piece in the synchronous shared folder of each MFP 2 that is published to the network.

Furthermore, because each MFP 2 can make its synchronous shared folder public, the MFPs 2 can synchronize with each other without using an external computer. It should be understood that synchronization can be performed using a synchronous shared folder of an external computer.

(Specific Example of Network Synchronization)

A specific example of network synchronization is described below according to the first embodiment. In this example, the network synchronization system 1, including an information processing device A and an information processing device B, performs network synchronization between the information processing device A and the information processing device B. The information processing device A has setting information pieces of a user 1 and a user 2, while the information processing device B has setting information pieces of the user 2 and a user 3. The setting information piece of the user 2 in the information processing device B is newer than that in the information processing device A. In order to reduce the load on synchronous shared folders, connection to a synchronous shared folder is made only once randomly within a specified synchronization time interval. If connection is made by the information processing device A, the information processing device B, and the information processing device A in this order, synchronization proceeds as described below.

1. First, the information processing device A connects to the synchronous shared folder of the information processing device A. The synchronous shared folder is empty at first, and therefore the information processing device A simply uploads the setting information pieces of the user 1 and the user 2 into the synchronous shared folder. As a result, the setting information pieces of the user 1 (A) and the user 2 (A) are stored in the synchronous shared folder of the information processing device A. It is to be noted that the alphabetic character shown in parentheses indicates the name of the information processing device in which the user is registered.

2. Next, the information processing device B connects to the synchronous shared folder of the information processing device A.

The information processing device B compares the last updated dates of the setting information pieces of the user 1 and the user 2 stored in the synchronous shared folder in the information processing device A with the last updated dates of the setting information pieces of the user 2 and the user 3 stored in the synchronous shared folder in the information processing device B. In this example, the information processing device B does not have a setting information piece of the user 1, but has the newer setting information piece of the user 2 than that in the information processing device A and the setting information piece of the user 3, which is not stored in the information processing device A. Therefore, the information processing device B downloads the setting information piece of the user 1 from the synchronous shared folder of the information processing device A, and uploads the setting information pieces of the user 2 and the user 3 into the synchronous shared folder of the information processing device B. As a result, the setting information pieces of the user 1 (A), the user 2 (B), and the user 3 (B) are stored in the synchronous shared folder of the information processing device B.

3. Then, the information processing device A connects to the synchronous shared folder of the information processing device B.

The information processing device A compares the last updated dates of the setting information pieces of the user 1 through the user 3 stored in the synchronous shared folder in the information processing device B with the last updated dates of the setting information pieces of the user 1 and the user 2 stored in the synchronous shared folder in the information processing device A. In this example, the information processing device A has the same setting information piece of the user 1 as that in the information processing device B; the older setting information piece of the user 2 than that in the information processing device B; and no setting information piece of the user 3. Therefore, the information processing device A downloads the setting information pieces of the user 2 and the user 3 from the synchronous shared folder of the information processing device B. As a result, the setting information pieces of the user 1 (A), the user 2 (B), and the user 3 (B) are stored in the synchronous shared folder of the information processing device A.

With the above-described process, the information processing device A can synchronize the setting information pieces with the information processing device B.

The following describes a case wherein an information processing device C having setting information pieces of the user 2 and a user 4 is newly added to the network synchronization system 1. The setting information piece of the user 2 in the information processing device C is newer than those in the information processing devices A and B.

In this case, the information processing device C that is newly connected to the network synchronization system 1 performs synchronization with another information processing device (e.g., the information processing device A) while treating all the setting information pieces stored in the information processing device C are older. This prevents the setting information pieces in the information processing device A and B of the network synchronization system 1 from accidentally being replaced with the setting information pieces in the information processing device C. Synchronization proceeds as follows.

4. The information processing device C connects to the synchronous shared folder of the information processing device A.

The information processing device C compares the last updated dates of the setting information pieces of the user 1 through the user 3 stored in the synchronous shared folder in the information processing device A with the last updated dates of the setting information pieces of the user 2 and the user 4 stored in the synchronous shared folder in the information processing device C. In this example, the information processing device C does not have setting information pieces of the user 1 and user 3, but has the setting information piece of the user 2, which is treated as being older than that in the information processing device A in the first authentication, and has the setting information piece of the user 4, which is not stored in the information processing device A. Therefore, the information processing device C downloads the setting information pieces of the users 1 through 3 from the synchronous shared folder of the information processing device A, and uploads the setting information piece of the user 4 into the synchronous shared folder of the information processing device C. As a result, the setting information pieces of the user 1 (A), the user 2 (B), the user 3 (B), and the user 4 (C) are stored in the synchronous shared folder of the information processing device C.

With the above-described process, the information processing device C can synchronize the setting information pieces with the information processing device A. It is to be noted that, in the first synchronization, the setting information pieces in the existing synchronous shared folders are used with priority, and the setting information piece of the user 2 of the information processing device C is deleted. This behavior is because the setting information pieces of the user 2 in the information processing devices A and B are already synchronized and used therein.

As described above, if synchronous shared folders of information processing devices of the network synchronization system 1 are published, each information processing device performs network synchronization, thereby eliminating the need for using a server. Furthermore, because all the information processing devices of the network synchronization system 1 can have the latest setting information pieces, even if one of the synchronous shared folders of the information processing devices is broken or a new HDD is installed as a replacement, the setting information pieces can automatically be synchronized again. The setting information pieces may be transmitted to and from a reliable external device such as an external file server in place of publishing the synchronous shared folders of information processing devices.

(Supplementary Explanation)

As described above, network synchronization of this embodiment takes steps of starting connection to the synchronization destination, synchronization with the synchronization destination, disconnection from the synchronization destination, conversion, and update of the setting information pieces of the information processing device.

During the period from the start of connection to the synchronization destination to the disconnection from the synchronization destination, exclusive control of the synchronous shared folder is performed. Upon the disconnection, if the last updated date of the current setting is more recent, updating the setting information pieces stored in the synchronous shared folder is not performed so that synchronization is made to fail. Then, after a certain period of time, connection is started again. If a predetermined number of failures are made, synchronization is postponed to the next synchronization time calculated based on the synchronization interval. If synchronization succeeds, conversion into a format applicable to the current setting is performed. During the period from the disconnection to the update of the setting information pieces of the information processing device, use of the current setting is prevented. Upon updating the setting information pieces of the information processing device, switching between HDD segments is performed after all the users log out. If the power is turned off, switching is performed next time the power is turned on. In this way, is it possible to perform synchronization of an information processing device in parallel even if the information processing device is in use, thereby synchronizing setting information pieces with minimum usage restrictions.

Second Embodiment

A second embodiment of the present invention is described below with reference to FIGS. 7 through 17.

In the above-described functional configuration, the network synchronization system of the first embodiment effectively synchronizes, among the plural MFPs, setting information pieces of the respective MFPs. In this embodiment, a network synchronization system is described that appropriately achieves synchronization of setting information pieces of the information processing devices.

In the second embodiment, a setting information piece stored in the setting information unit 210 of FIG. 2 of the first embodiment 1 may be a personal setting information piece stored in a below-described personal setting information piece (authentication reference information) unit 1220 of FIG. 10. That is, the setting information unit 210 of FIG. 2 corresponds to the personal setting information unit 1220 of FIG. 10.

This configuration provides another advantage that, for example, if IC card authentication is made usable in one MFP, IC card authentication is automatically made usable in other MFPs.

(Exemplary System Configuration)

Figure 7:
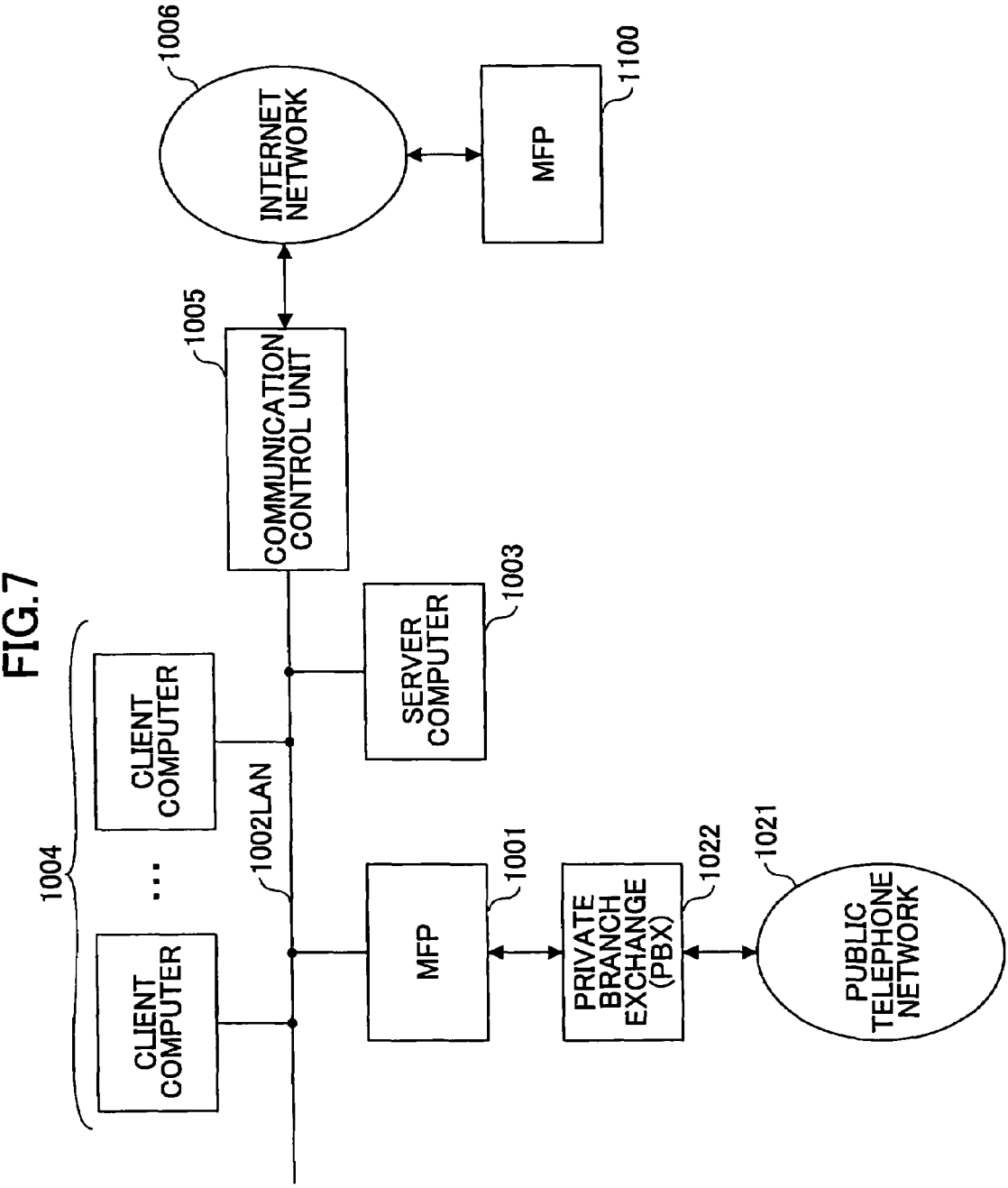
FIG. 7 is a schematic diagram illustrating an exemplary configuration of a network synchronization system including a digital color multifunction printer according to a second embodiment.

FIG. 7 is a schematic diagram illustrating an exemplary configuration of a network synchronization system 1 including a digital color multifunction device (MFP) 1001 according to the second embodiment. As shown in FIG. 7, in the network synchronization system 1 of this embodiment, the MFP 1001 is connected to a server computer 1003 and plural client computers 1004 via a LAN (Local Area Network) 1002 as a communication network. The server computer 1003 executes various information processing operations. The server computer 1003 supports, for example, an FTP (File Transfer Protocol) and an HTTP (HyperText Transfer Protocol), and provides functions of a Web server and a DNS (Domain Name Server). In other words, in this system 1, image processing functions such as an image input function (scanner function), an image output function (print function), and an image storage function can be shared over the LAN 1002.

This system 1 is connected to an Internet network 1006 through a communication control unit 1005, thereby allowing data communications with an external environment through the Internet network 1006. An MFP 1100 having the same functions as the MFP 1001 is present on the Internet network 1006.

Any device that enables at least communications based on TCP/IP may be used as the communication control unit 1005, although a router, a switching device, a modem, or a Digital Subscriber Line (DSL) modem is generally used. The LAN 1002 is not limited to a wire communication system, and a wireless communication system (infrared rays and radio waves) may be used. Alternatively, a communication system using an optical fiber may be used.

(Example of MFP 1001)

Figure 8:
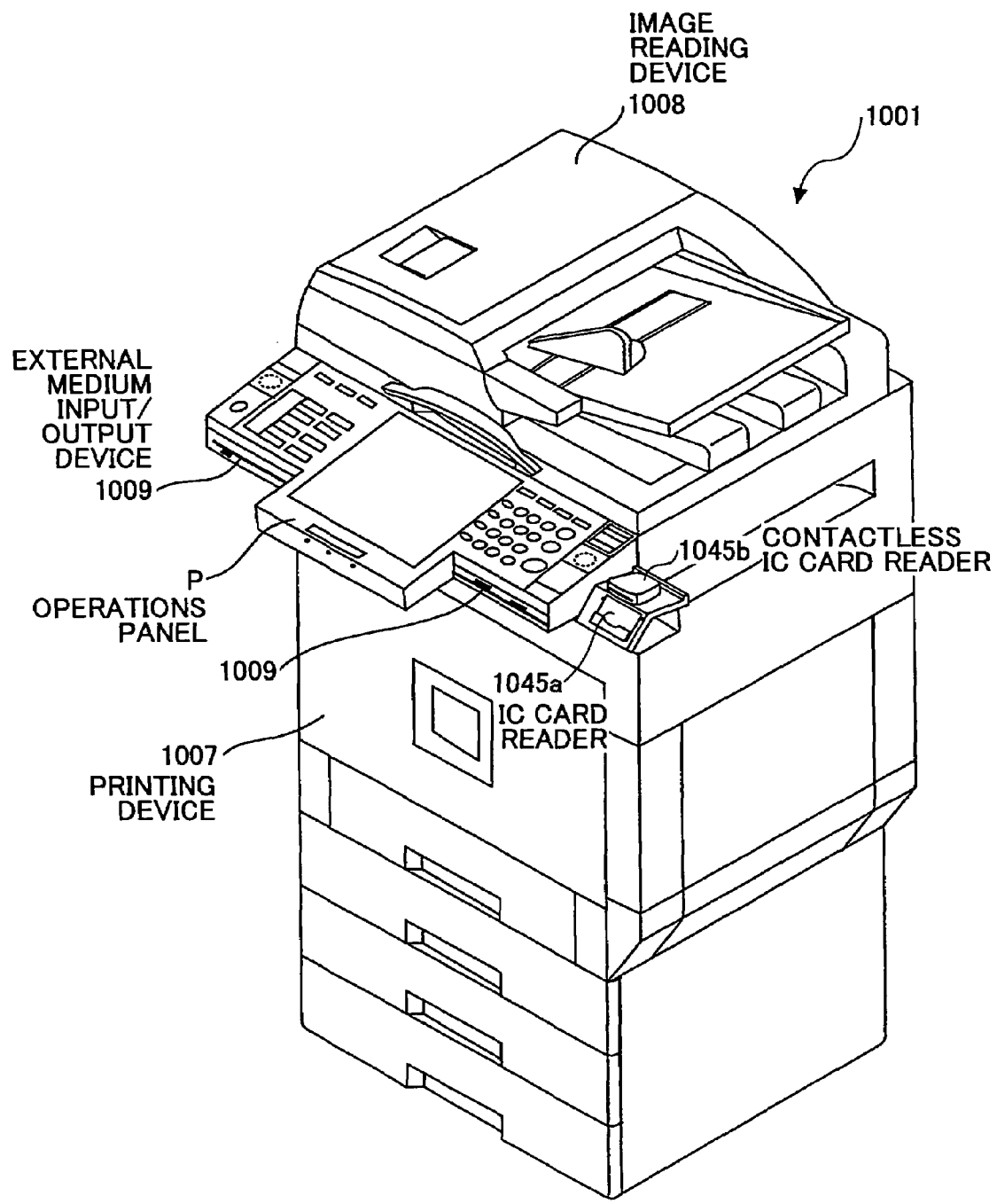
FIG. 8 is a schematic perspective view illustrating a digital color multifunction printer.
Figure 9:
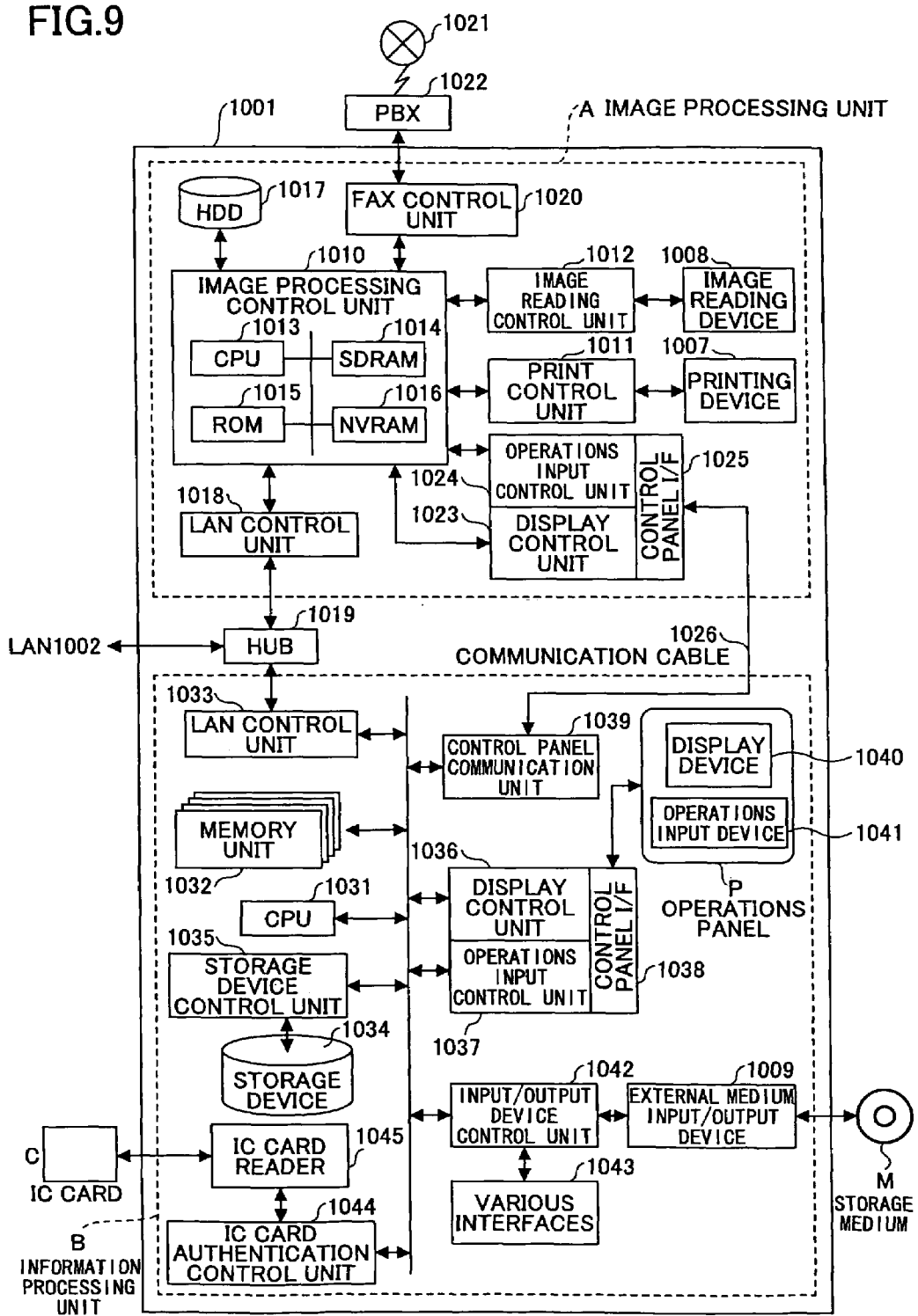
FIG. 9 is a block diagram illustrating electric connections between components of a digital color multifunction printer.

The MFP 1001 is described with reference to FIGS. 8 and 9. The description of the MFP 1001 applies to the MFP 1100. FIG. 8 is a schematic perspective view illustrating the MFP 1001. FIG. 9 is a block diagram illustrating electric connections between components of the MFP 1001.

As shown in FIG. 8, the MFP 1 includes a printing device 1007 configured to form an image on a medium such as a transfer paper, and an image reading device 1008 disposed above the printing device 1007 and configured to read an image from a document. An operations panel P is provided on the outer surface of the image reading device 1008. The operations panel P provides visual indications to an operator and receives inputs, such as settings of functions, from the operator. Under the operations panel P, an external medium input/output device 1009 is disposed such that a slot for insertion of a recording medium M is exposed to the outside. The external medium input/output device 1009 is configured to read program code, image data, etc., from the recording medium M (see FIG. 9) such as an optical disk and a flexible disk, and write program code, image data, etc., into the recording medium M.

The MFP 1001 of FIG. 8 includes IC card readers 1045 (a contact IC card reader 1045a and a contactless IC card reader 1045b).

An IC card C (see FIG. 9) for the contact IC card reader 1045a (or the contactless IC card reader 1045b) is an ID card, which is issued to each operator of the MFP 1001 and has authentication information recorded therein for identifying the operator. The authentication information recorded in the IC card is read by the contact IC card reader 1045a (or the contactless IC card reader 1045b) so that use of the MFP 1001 is allowed within the scope of the permission granted according to the authentication information.

As shown in FIG. 9, the structure of the MFP 1001 is roughly divided into an image processing unit A and an information processing unit B. The printing device 1007 and the image reading device 1008 belong to the image processing unit A. On the other hand, the operations panel P, the external medium input/output device 1009, and the IC card reader 1045 belong to the information processing unit B configured to perform various information processing operations.

First, the image processing unit A is described below. The image processing unit A of FIG. 9, including the printing device 1007 and the image reading device 1008, has an image processing control unit 1010 that controls overall image processing in the image processing unit A. The image processing control unit 1010 is connected to a print control unit 1011 that controls the printing device 1007, and an image reading control unit 1012 that controls the image reading device 1008.

The print control unit 1011 outputs a print instruction containing image data to the printing device 1007 under the control of the image processing control unit 1010, and causes the printing device 1007 to form an image on a medium, such as a transfer paper, and output the medium with the image. The printing device 1007 is capable of full-color printing, and employs any one of printing systems such as an electrophotographic system, an inkjet system, a dye sublimation thermal transfer system, a silver salt photographing system, a direct thermal recording system, and a dye diffusion thermal transfer system.

The image reading control unit 1012 drives the image reading device 1008 under the control of the image processing control unit 1010 to cause the image reading device 1008 to read a document by collecting reflection light beams, which are emitted by a lamp onto the surface of a document, onto a light receiving element (e.g., CCD (charge-coupled device)) using a mirror and a lens and then generate 8-bit RGB digital image data by A/D conversion.

The image processing control unit 1010 is a microcomputer, in which a CPU (Central Processing Unit) 1013 as a main processor, an SDRAM (Synchronous Dynamic Random Access Memory) 1014, a ROM (Read Only Memory) 1015, and an NVRAM (Nonvolatile Random Access Memory) 1016 are connected to each other through a bus. The SDRAM 1014 temporarily stores the image data read from the image reading device 1008 to be supplied to the printing device 1007 for imaging. The ROM 1015 stores a control program and the like. The NVRAM 1016 is capable of retaining data even when the power is off and is configured to store a system log, system settings, log information, etc.

The image processing control unit 1010 is connected to an HDD (Hard Disk Drive) 1017 as a storage unit that stores a large amount of image data and job history or the like, a LAN control unit 1018 that connects the image processing unit A to the LAN 1002 through a hub 1019 as a line concentrator provided in the MFP 1001, and a FAX control unit 1020 that controls facsimile operations. The FAX control unit 1020 is connected to a PBX (private branch exchange) 1022 communicating with a public telephone network 1021, which allows the MFP 1001 to communicate with a remote facsimile machine.

The image processing control unit 1010 is also connected to a display control unit 1023 and an operations input control unit 1024. The display control unit 1023 outputs an image-display control signal to the information processing unit B through a communication cable 1026 connected to a control panel interface (I/F) 1025 under the control of the image processing control Unit 1010, and controls an operations panel P of the information processing unit B to display images.

The operations input control unit 1024 receives an input control signal through the communication cable 1026 connected to the control panel I/F 1025 under the control of the image processing control unit 1010. The input control signal corresponds to setting a function or an input operation performed by an operator using the operations panel P of the information processing unit B. In other words, the image processing unit A can directly monitor the operations panel P of the information processing unit B through the communication cable 1026.

That is, the image processing unit A is an image processing unit of an existing image processing device to which the communication cable 1026 is connected for utilizing the operations panel P of the information processing unit B. In other words, the display control unit 1023 and the operations input control unit 1024 of the image processing unit A operate as if they are directly connected to the operations panel P.

Based on the configuration, the image processing unit A analyzes print data as image information and a command to perform a print operation received from an external device (e.g., the server computer 1003, the client computer 1004 (both shown in FIG. 7), and a facsimile machine). The image processing unit A then expands the print data into bitmap output image data for printing, and analyzes the print mode from the command to select an operation. The image processing unit A operates in response to the print data and the command received through the LAN control unit 1018 or the FAX control unit 1020.

The image processing unit A can transmit print data and data of a read document stored in the SDRAM 1014 and the HDD 1017, and output image data obtained by processing these data for output, and compressed data obtained by compressing the output image data, to an external device (e.g., the server computer 1003, the client computer 1004, or a facsimile machine).

Furthermore, the image processing unit A transmits the image data read by the image reading device 1008 to the image processing control unit 1010, corrects signal degradation due to quantization into optical and digital signals, and writes the image data to the SDRAM 1014. The image data held in the SDRAM 1014 in the above manner are converted by the print control unit 1011 and then are output to the printing device 1007.

Next, the information processing unit B including the operations panel P is described below. The information processing unit B is a microcomputer controlled by a general-purpose OS (Operating System) that is generally used in an information processing unit such as a personal computer. The information processing unit B has a CPU 1031 as a main processor. The CPU 1031 is connected to a memory unit 1032 and a storage device control unit 1035 through a bus. The memory unit 1032 includes a RAM as a working area of the CPU 1031 and a ROM that stores a boot program and the like. The storage device control unit 1035 controls data input to and output from a storage device 1034, such as an HDD, storing an OS and programs.

The CPU 1031 is also connected to a LAN control unit 1033 as a communication interface for connecting the information processing unit B to the LAN 1002 through the hub 1019. An IP (Internet Protocol) address as a network address assigned to the LAN control unit 1033 is different from an IP address assigned to the LAN control unit 1018 of the image processing unit A. In other words, two IP addresses are assigned to the MFP 1001 according to the second embodiment. That is, the image processing unit A and the information processing unit B are connected to the LAN 1002, which allows data exchange between the image processing unit A and the information processing unit B.

The MFP 1001 appears to have only one IP address because the MFP 1001 is connected to the LAN 1002 through the hub 1019. This facilitates handling of connection wires without impairing the appearance of the MFP 1001.

The CPU 1031 is also connected to a display control unit 1036 that controls the operations panel P, an operations input control unit 1037, and an IC card authentication control unit 1044. The operations panel P includes a display device 1040 such as, for example, an LCD (Liquid Crystal Display), and an operations input device 1041. The operations input device 1041 includes a touch panel (not shown) of an ultrasonic elastic wave type on the surface of the display device 1040, and a keyboard (not shown) having plural keys.

The keyboard includes a start key for starting an operation such as image reading, a numeric keypad for entering numbers, a read-condition setting key for specifying the destination of read image data, a clear key, etc. The display control unit 1036 outputs an image-display control signal to the display device 1040 through a control panel I/F 1038, and causes the display device 1040 to display a predetermined item corresponding to the image-display control signal.

The operations input control unit 1037 receives, via the control panel I/F 1038, an input control signal corresponding to the setting of a function or an input operation performed by the operator using the operations input device 1041. The IC card authentication control unit 1044 reads authentication information, etc., recorded in an IC card C when a user holds the IC card C over the IC card reader 1045, and allows the user to use the MFP 1001 within the scope of the permission granted according to the read authentication information.

The CPU 1031 is also connected to a control panel communication unit 1039, which is connected to the control panel I/F 1025 of the image processing unit A through the communication cable 1026. The control panel communication unit 1039 receives the image-display control signal from the image processing unit A and transmits, to the image processing unit A, an input control signal corresponding to the setting of a function or an input operation performed by the operator using the operations panel P. As is described in greater detail below, the image-display control signal from the image processing unit A received by the control panel communication unit 1039 is converted into data for the display device 1040 of the operations panel P, and the converted data are output to the display control unit 1036. An input control signal corresponding to the setting or an input operation performed by the operator using the operations panel P is converted into data in a format according to specifications of the image processing unit A, and the converted data are input to the control panel communication unit 1039.

As mentioned above, the storage device 1034 stores an OS and programs executed by the CPU 1031. In this sense, the storage device 1034 functions as a storage medium for storing programs. When a user turns on the MFP 1001, the CPU 1031 starts the boot program in the memory unit 1032 and loads the OS from the storage device 1034 into the RAM of the memory unit 1032 to start up the OS. The OS starts a program, reads information, or stores information according to the operation by the user. A typical example of such an OS is Windows (registered trademark). An operations program that runs on such an OS is referred to as an application program. The OS of the information processing unit B is the same type as an OS of an information processing device (e.g., the server computer 1003, the client computer 1004), which may be a general-purpose OS (e.g., Windows).

As mentioned above, the MFP 1001 includes the external medium input/output device 1009 such as a flexible disk drive, an optical disk drive, an MO (Magneto-optical) disk drive, and a media drive. The external medium input/output device 1009 reads program code and image data from or writes program code and image data into a storage medium M that stores the OS, device drivers, various program codes (control programs) such as various application programs, and the image data. The storage medium M includes a flexible disk, a hard disk, an optical disk (CD-ROM, CD-R, CD-RW, DVD-ROM, DVD-RAM, DVD-R, DVD+R, DVD-RW, DVD+RW, etc.), an MO (magneto-optical) disk, and a semiconductor medium such as an SD memory card (registered trademark), a Compact Flash (registered trademark), a Memory Stick (registered trademark), and a Smart Media (registered trademark). The external medium input/output device 1009 is controlled by an input/output device control unit 1042 connected to the CPU 1031 through the bus.

Therefore, the application programs stored in the storage device 1034 may include the application programs loaded from the storage medium M. Accordingly, the storage medium M can function as a storage medium for storing the application programs as well. Application programs may be loaded into the storage device 1034 from an external device through the Internet network 1006 and the LAN 1002.

The input/output device control unit 1042 is also connected to various types of interfaces 1043, such as a USB, IEEE 1394, and a SCSI, to which various types of devices (e.g., a digital camera) are connectable.

Characteristic operations performed by the MFP 1001 are described below. The MFP 1001 includes plural devices that perform different operations. In this example, the image processing unit A and the information processing unit B can perform operations independently. Therefore, for example, the image processing unit A can read an image while the information processing unit B receives electronic mail. In this example, since the results of the operations do not affect each other, there is no problem in that the image processing unit A and the information processing unit B operate independently.

Furthermore, in the MFP 1001, a program running on the information processing unit B can process the result of an operation using functions of the image processing unit A. For example, it is possible to perform, using a predetermined application program, a character recognition operation on image data of an image of a document read by the image reading device 1008 of the image processing unit A, thereby obtaining a text document.

However, if the image processing unit A and the information processing unit B always operate independently from each other, an application program of the information processing unit B cannot process the result of an operation using functions of the image processing unit A. In this example, the functions of the image processing unit A can be used by operating an application program based on a combination of processing modules.

In the image processing unit A, a module of a control system executed by the image processing control unit 1010 is formed of an application program that controls the MFP 1001 to perform the original functions of an MFP. The MFP 1001 is provided with an interface for a network function module in the LAN control unit 1018 which is accessible only from the information processing unit B via the hub 1019 (LAN 1002).

The network function module enables use of standard MFP functions such as a scanner function and a facsimile function, which are executed in the image processing control unit 1010, via the LAN 1002. The network function module cannot be used from the image processing unit A.

When the TCP/IP (Transmission Control Protocol/Internet Protocol) that monitors access from the LAN 1002 detects a request for connection to a port number, a module having a corresponding function is activated.

For example, when a request of connection to a port number 1002 is detected, a module of a facsimile receiving function is activated. The activated module operates according to an operation request from the source of the connection request and sends back a necessary response.

Next, characteristics of an application program of the information processing unit B are described below. A keyword generation application is illustrated as an example.

The keyword generation application performs character recognition on read image data and generates a keyword from the result of the character recognition. In the overall information processing unit B, application programs operate under the control of the OS.

The application programs can use functions provided by the OS. In other words, when the application program is executed, the application program calls the functions of the OS as software modules and causes them to perform necessary operations. An example of such a module is a TCP/IP module. The TCP/IP control module implements a standard function of the OS, thereby communicating with other information devices connected by the TCP/IP.

Furthermore, an independent application program installed for use by other application programs can be used.

For example, an OCR engine only performs character recognition on image data. The OCR engine operates not singly but is used as a component (module) of another application program.

Thus, since each application program can be executed under the control of the OS in the overall information processing unit B, it is possible to develop an application program that includes one or a combination of these functions.

However, with the existing technology, it is not possible to directly use the functions of the image processing unit A in this way.

More specifically, as mentioned above, the MFP 1001 includes the image processing unit A for providing the original functions of an MFP and the information processing unit B for executing application programs. The image processing unit A and the information processing unit B are connected to each other via the LAN 1002 by a network protocol (TCP/IP in this example) in the MFP 1001.

This physical connection between the image processing unit A and the information processing unit B allows data communications between the image processing unit A and the information processing unit B. However, with only the existing technology, it is not possible to use the functions of the image processing unit A from the inside of the application program running in the information processing unit B.

A method for enabling use of the functions of the image processing unit A from the inside of the application program running in the information processing unit B is described below.

For example, in the keyword generation application, image data read by the image reading device 1008 controlled by the image processing unit A are subjected to character recognition.

In order to instruct the image reading device 1008 to perform an image reading operation, a request for TCP/IP connection to the port number 1001 is sent to the image processing unit A. In this step, data indicating the content of the operation are also sent in the form of a data stream. The function specified by the port number 1001 is configured to cause the image reading device 1008 to read an image and transmit the read image data with a given file name to the information processing unit B. Such content of the operation is determined and a port number is assigned one for each function in advance so as to allow these functions to be used separately.

Thus, the functions of the image processing unit A can be used from the keyword generation application. The communication protocol is not limited to the TC-P/IP and may be any suitable protocol.

(Exemplary Functional Configuration of MFP 1001)

Figure 10:
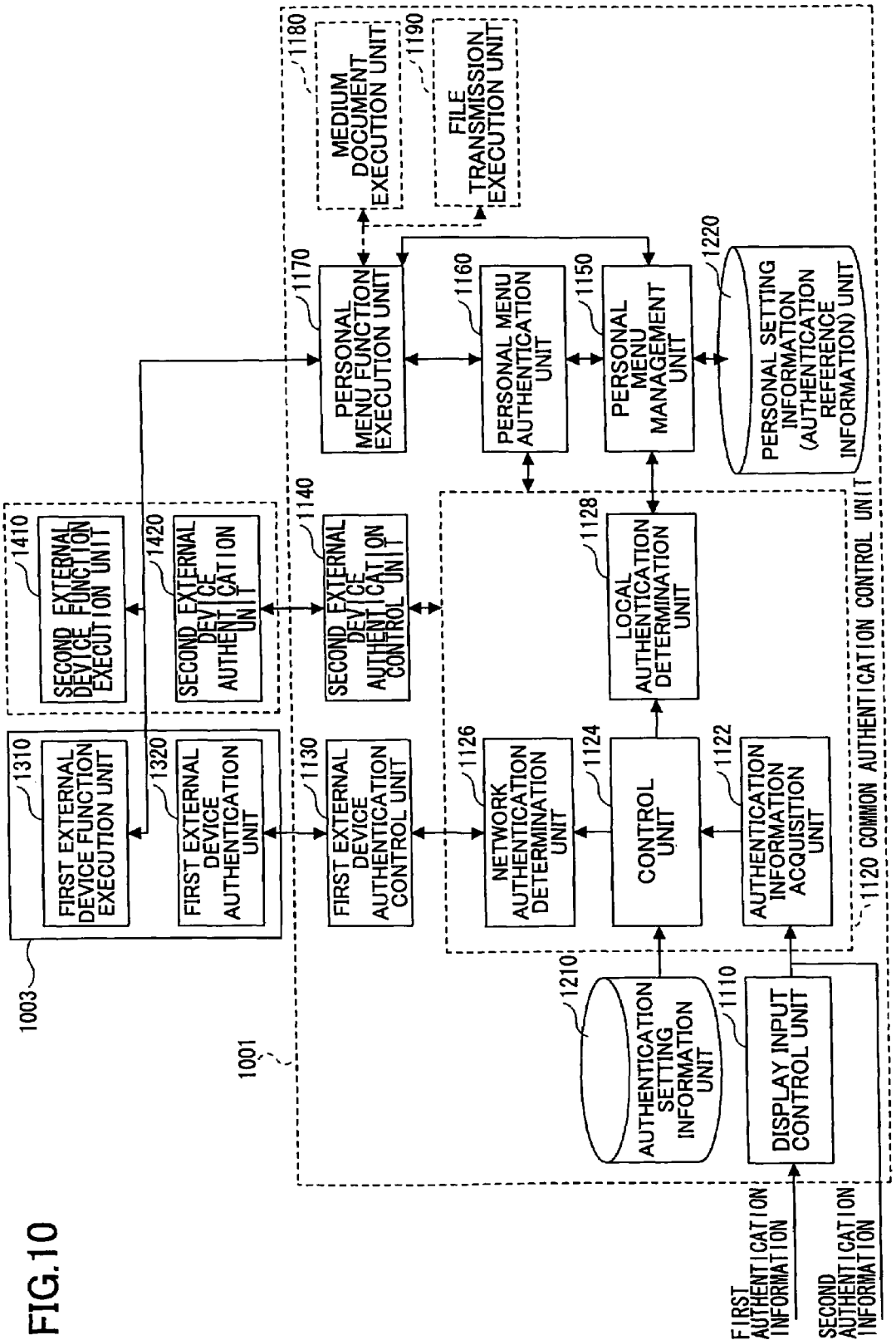
FIG. 10 is a block diagram illustrating the functional configuration of a digital color multifunction printer according to the second embodiment.

FIG. 10 is a block diagram illustrating the functional configuration of the MFP 1001 according to the second embodiment. The arrows of FIG. 10 between blocks indicate representative flows of signals and do not limit functions of the blocks. The functional configuration of the second embodiment may include the above-described functional configuration of FIG. 2.

In FIG. 10, the MFP 1001 includes a display input control unit 1110, a common authentication control unit 1120, a first external device authentication control unit 1130, a second external device authentication control unit 1140, a personal menu management unit 1150, a personal menu authentication unit 1160, a personal menu function execution unit 1170, a medium document execution unit 1180, a file transmission execution unit 1190, an authentication setting information unit (authentication setting information storage unit) 1210, and a personal setting information (authentication reference information) unit (personal setting information storage unit) 1220. As mentioned above, the personal setting information unit 1220 of FIG. 10 corresponds to the setting information unit 210 of FIG. 2.

The common authentication control unit 1120 includes an authentication information acquisition unit 1122, a control unit 1124, a network authentication determination unit 1126, and a local authentication determination unit 1128.

The display input control unit 1110 performs various control operations related to display and input operations. For example, the display input control unit 1110 has a function of an authentication information input unit that inputs authentication information (user name, password, etc.,) of a user entered on an authentication information input screen. The authentication information input screen is displayed by pressing a personal authentication key on a main screen displayed on the operations panel P (see FIG. 9).

The common authentication control unit 1120 performs various control operations related to authentication. For example, the common authentication control unit 1120 causes the authentication information acquisition unit 1122, the control unit 1124, the network authentication determination unit 1126, and the local authentication determination unit 1128 to perform various control operations related to authentication using the authentication information entered by the display input control unit 1110 according to authentication setting information (see FIGS. 11A-11C) stored in the below-described authentication setting information unit 1210.

The authentication information acquisition unit 1122 acquires authentication information pieces. For example, the authentication information acquisition unit 1122 acquires authentication information such as a user name and a password entered by the display input control unit 1110. The authentication information acquisition unit 1122 also acquires authentication information stored in an external storage medium (e.g., authentication IC card) using an external storage medium reading/writing device such as the IC card readers 1045 (see FIG. 9). If the MFP 1001 provides functions for biometric authentication such as fingerprint authentication and vein authentication, it is possible to acquire authentication information by scanning fingerprints or the pattern of veins in the finger or palm of the hand. In this way, the authentication information acquisition unit 1122 acquires a first authentication information piece such as entered user name and password, and a second authentication information piece, different from the first authentication piece, recorded in the authentication IC card.

The control unit 1124 controls various authentication operations based on the authentication information pieces acquired by the authentication information acquisition unit 1122 according to the authentication setting information stored in the below-described authentication setting information unit 1210. More specifically, the control unit 1124 controls various authentication operations using network authentication determination unit 1126 and the local authentication determination unit 1128 (both described below).

The network authentication determination unit 1126 determines whether network authentication performed in an external device (e.g., the server computer 1003 of FIG. 7) connected via a network is successful. For example, the network authentication determination unit 1126 sends the authentication information piece acquired by the authentication information acquisition unit 1122 to the external device via the below-described first external device authentication control unit 1130, and receives information indicating whether authentication based on the authentication information piece is successful from the external device, thereby determining whether the authentication is successful based on the received information.

The local authentication determination unit 1128 determines whether authentication performed in the MFP 1001 is successful. For example, the local authentication determination unit 1128 determines whether authentication is successful by comparing the authentication information piece acquired by the authentication information acquisition unit 1122 with an authentication reference information piece stored in the below-described personal setting information unit 1220.

The first external device authentication control unit 1130 performs control operations related to authentication in the first external device 1003 (e.g., the server computer 1003 of FIG. 7). For example, the first external device authentication control unit 1130 performs a control operation related to authentication by sending the authentication information piece acquired by the authentication information acquisition unit 1122 to the first external device 1003, and receiving information indicating whether authentication based on the authentication information piece is successful from the first external device 1003.

The second external device authentication control unit 1140 performs control operations related to authentication in the second external device 1004 (the MFP 1001 in this example). In this example, the functions of the MFP 1001 are divided into two groups: one of the groups includes a personal menu function for each user of the MFP, and the other group includes the rest of the functions (e.g., common functions of the MFP 1001 such as scanner and copier functions). In this embodiment, a device that provides the functions of the latter group is identified as the second external device 1004. The second external device 1004 may have a configuration different from that of the MFP 1001 connected via the network in the same manner as the above-described first external device 1003.

The personal menu management unit 1150 manages personal setting information pieces stored in the below-described personal setting information unit 1220. The personal menu authentication unit 1160 performs authentication related to the use of personal menu functions for each user of the MFP 1001. For example, the personal menu authentication unit 1160 performs authentication by comparing the authentication information piece acquired by the authentication information acquisition unit 1122 with an authentication reference information piece stored in the personal setting information unit 1220.

The personal menu function execution unit 1170 calls, if authentication in the personal menu authentication unit 1160 succeeds, a personal setting information piece stored in the personal setting information unit 1220 via the personal menu management unit 1150, and starts a personal menu based on the called personal setting information piece. The medium document execution unit 1180 executes various operations such as reading and writing documents in a medium such as a Multimedia Card (registered trademark) connected to, for example, the external medium input/output device 1009 (see FIG. 8). The file transmission execution unit 1190, which is one of the functions of the personal menu, sends a file to a device connected via a network.

The authentication setting information unit 1210 stores authentication setting information pieces related to authentication in the MFP 1001. Examples of authentication setting information pieces are described below with reference to FIGS. 11A-11C. The personal setting information unit 1220 stores a personal setting information piece (including an authentication reference information piece for authentication of an authentication information piece) in the MFP 1001. An example of a synchronization setting information piece is described below with reference to FIG. 12B.

With the above-described functional configuration, the MFP 1001 performs authentication of the MFP 1001, the first external device 1003, and the second external device 1004. If authentication succeeds, use of the functions of each device is allowed.

(Examples of Authentication Setting Information Pieces)

FIGS. 11A-11C are drawings each showing an example of an authentication setting information piece stored in the authentication setting information unit 1210. Examples of authentication setting information pieces stored in the authentication setting information unit 1210 of FIG. 10 are described below.

FIG. 11A shows an example of a personal menu authentication setting table for authentication related to a personal menu in the MFP 1001. The table of FIG. 11A includes the following items: "first authentication", "second authentication", and "login only with personal menu authentication in the case of connection failure to external device".

In the MFP 1001 of this embodiment, first authentication and second authentication are performed in this order. If both of the authentications are successful, login to a personal menu for a user is allowed. In this example, the first authentication is for determining a personal menu. The second authentication is for improving security. The operations of these authentications are described in greater detail below with reference mainly to FIG. 14. After the first and second authentications, authentication of the MFP 1001 (MFP authentication) may be performed in the background so that three authentications are performed in combination.

In FIG. 11A, network authentication is selected in "first authentication", and IC card authentication (authentication based on an IC card) is selected in "second authentication". In this case, network authentication and IC card authentication are performed in this order and, if both of the authentications succeed, login to the personal menu is allowed. In the case where IC card authentication and network authentication are selected in "first authentication" and "second authentication", respectively, IC card authentication and network authentication are performed in this order. The type of authentication selectable in "first authentication" and "second authentication" is not limited to network authentication and IC authentication. The type of authentication can be selected from the types of authentication available in the MFP 1001.

The setting item "login only with personal menu authentication in the case of connection failure to external device" specifies whether to allow login only with personal menu authentication by the personal menu authentication unit 1160 (see FIG. 10) in the case where, for example, the MFP 1001 cannot connect to an external device via a network due to failures in the network.

This allows, if network authentication has succeeded once, to login with only personal menu authentication in the case of connection failure to a server. If a setting information piece related to the below-described network authentication is modified, the record of the success may be deleted.

FIG. 11B shows an example of a first external device authentication setting table as setting information related to network authentication (network authentication for the first external device 1003 in this example) in the MFP 1001. The table of FIG. 11B includes the following items: "server type", "domain name", "identification name", and "first external device address", which indicate information related to the first external device 1003. The table further includes the following items: "link with personal menu authentication" and "automatically register/update home directory".

The item "link with personal menu authentication" specifies setting information related to linking network authentication with personal menu authentication. This item includes the following items, which are briefly described below.

The item "automatically register personal menu (first authentication only)" specifies whether to automatically register a personal menu using an authentication information piece used for network authentication. The item "automatically update password (first authentication only)" specifies whether to automatically update a password used for personal menu authentication with a password used for network authentication. The item "automatically update personal information (second authentication only)" specifies whether to automatically update authentication information used for personal menu authentication with authentication information used for network authentication.

The item "automatically register/update home directory" specifies whether to automatically register/update a shared-medium in a directory under a home directory according to a home directory setting of the first external device 1003.

Thus, in the case of network authentication, it is possible to automatically register a personal menu (first authentication only), automatically update a password (first authentication only), automatically update personal information (second authentication only), and automatically register/update a home directory (first authentication and second authentication).

FIG. 11C shows an example of an IC card authentication setting table for IC card authentication in the MFP 1001. The table of FIG. 11C includes the following items: "link with personal menu authentication", "use name/password authentication in combination", and "limit to IC card non-registered user".

The item "link with personal menu authentication" specifies setting information related to linking IC card authentication with personal menu authentication. This item includes the following items, which are briefly described below.

The "automatically register personal menu (first authentication only)" specifies whether, if an unregistered IC card is read by the MFP 1001 upon authentication, to automatically register a personal menu according to authentication information used for IC card authentication. The item "automatically register IC card (first authentication only)" specifies whether, if an unregistered IC card is read by the MFP 1001 upon authentication, to automatically prompt entry of user name/password information and register the IC card of a user for whom authentication based on the entered user name/password has succeeded.

The item "use username/password authentication in combination" allows performing authentication using any of an IC card and user name/password.

The item "limit to user with unregistered IC card" specifies whether to allow authentication using only an IC card not registered in the MFP 1001 upon performing authentication.

Thus, in the case of IC card authentication, it is possible to automatically register a personal menu (first authentication only), automatically register an IC card (first authentication only), and use user name/password authentication (first authentication and second authentication). It is also possible to limit authentication to users with unregistered IC cards.

Furthermore, in the case where the "first authentication" is IC card authentication and the "second authentication" is network authentication, if a personal menu is automatically registered with the user name of the IC card number and then personal information is updated upon network authentication, the user name of the IC card number can automatically be replaced by the user name for network authentication.

(Example of Personal Setting Information Piece (Authentication Reference Information Piece))

FIGS. 12A and 12B are drawings each showing an example of a personal setting information piece stored in the personal setting information unit 1220. Examples of personal setting information pieces stored in the personal setting information unit 1220 of FIG. 10 are described below. The personal setting information pieces are setting information and are provided one for each of plural users. The personal setting information pieces include a personal setting information piece of FIG. 12B and an authentication reference information piece of FIG. 12A to be associated with the personal setting information piece of FIG. 12B.

FIG. 12A shows an example of an authentication reference information piece for authenticating an authentication information piece acquired by the MFP 1001. The items "IC card", "personal menu authentication user name", "personal menu authentication password", "first external device user name" "first external name password", "second external device user name" and "second external device password" are associated with each other for each user of the MFP 1001. The items are briefly described below.

The "IC card" is an authentication reference information piece for authenticating authentication information recorded in an IC card. The "first external device user name" and the "first external device password" are authentication reference information pieces for performing authentication by the first external device 1003 (see FIG. 10). The "second external device user name" and the "second external device password" are authentication reference information pieces for performing authentication by the second external device 1004 (see FIG. 10). The "personal menu authentication user name" and the "personal menu authentication password" are authentication reference information pieces for performing authentication by the personal menu authentication unit 1160 (see FIG. 10).

Among these authentication reference information pieces, the "IC card", the "first external device user name" and the "first external device password" are setting information pieces that are common to plural MFPs, and are acquired from a server device or the like, which is connected to the network synchronization system 1 and is configured to manage the setting information pieces. The "second external device user name", the "second external device password", the "personal menu authentication user name" and the "personal menu authentication password" are setting information pieces specific to the MFP 1001.

That is, according to the network synchronization system 1 in the second embodiment, it is possible to perform synchronization among plural MFPs for synchronizing setting information pieces (such as the "second external user name") specific to individual MFPs. In order to perform such synchronization, each MFP has an authentication reference information table shown in FIG. 12A. The setting information pieces (such as the "IC card") common to the plural MFPs may be acquired through communications with a server device or the like.

FIG. 12B shows an example of a personal setting information piece managed by the MFP 1001. This personal information piece is provided one for each user of the MFP 1001 and includes items "name (in hiragana)", "name (in kanji)", "division", "personal menu authentication information", "first external device authentication information", "second external device authentication information", "automatically erase personal menu", "personal menu automatic erasure setting storing region", "function restriction information", "registered destination information" "shared-medium information", and "the latest usage storing region", which are associated with each other. The number of the personal setting information pieces of FIG. 12B corresponds to the number of the registered users (which may be one or more). The items are briefly described below.

In FIG. 12B, the "name (in hiragana)" and the "name (in kanji)" indicate the name of the user. The "division" indicates the name of the group to which the user belongs. The "personal menu authentication information" is a personal menu authentication information piece of the user and corresponds to the "personal menu authentication user name" and the personal menu authentication password" of the user shown in FIG. 12A. The "first external device authentication information" is first external device authentication information of the user and corresponds to the "first external device user name" and the "first external device password" of the user shown in FIG. 12A. The "second external device authentication information" is second external device authentication information of the user and corresponds to the "second external device user name" and the "second external device password" of the user shown in FIG. 12A. The "automatically erase personal menu" is information related to automatic erasure of a personal menu of the user. The "personal menu automatic erasure setting storing range" is setting information related to automatic erasure of a personal menu of the user. This setting information specifies whether to automatically erase a personal menu and the time period for storing the personal menu, that is, the time period (e.g., three days) from the last use to execution of automatic erasure.

The "function restriction information" of FIG. 12B is restriction information related to functions of the MFP 1001 to be used by the user. More specifically, in the case where the MFP 1001 provides multiple functions including a copier function, a facsimile function, a printer function, a scanner function, and a function for delivering an input image (an image scanned by the scanner function or an image input by the printer function or the facsimile function), the "function restriction information" is setting information indicating whether to allow the user to use each of these functions. The functions of the MFP 1001 that can be used by the user are limited based on the function restriction information.

The "registered destination information" of FIG. 12B is an address book in which information related to destinations used by the user (destinations to which an input image is sent) is registered. The "shared-medium information" is an address book for viewing a shared medium under the home directory assigned to the user. The "latest usage storing region" is restored information of a personal menu which was last used by the user.

The items of the personal setting information piece shown in FIG. 12B are described above. Among those, the personal setting information of the items (4) and (6)-(12) of FIG. 12B is setting information which is to be synchronized by the MFP 1001 with setting information of another MFP 1001. This is because the personal setting information of these items is setting information specific to each user and is specified in the MFP 1001. On the other hand, the personal setting information of the items (1)-(3) and (5) of FIG. 12B is setting information on which synchronization is not performed. This is because the personal setting information of these items is setting information to be managed by the first external device 1003 (e.g., server computer 1003), and the MFP 1001 can acquire this setting information through communications with the first external device 1003.

That is, according to the network synchronization system 1 in the second embodiment, it is possible to perform synchronization among plural MFPs for synchronizing setting information specific to each user in each MFP contained in personal setting information held by each MFP. Meanwhile, common setting information that is not specific to each user in each MFP is acquired through communications between the MFP and the first external device 1003. Then, in each MFP, the setting information specific to each user and the common setting information not specific to each user are associated with each other as in FIG. 12B.

This offers the following advantages. In the case where a general-purpose server as a first external device 1003 that centrally manages user information pieces is present, the general-purpose server can be integrated into the network synchronization system 1 without making any special design changes to the general-purpose server. According to the network synchronization system 1, it is possible to properly realize synchronization according to the setting information of each device.

In the case where the personal setting information to be synchronized between plural MFPs is the "function restriction information" of FIG. 12B, the user who can use a function in an MFP can use the same function in another MFP. For example, the user A can use a function "scan to mail (automatically send a scanned image to my mail address)" in an MFP installed in the headquarters to which the user A belongs. Suppose that the user A wishes to use the "scan to mail" function of an MFP installed in a branch office when he/she visits the branch office. In this case, as the function restriction information of the user A is synchronized between the MFP in the headquarters and the MFP in the branch office, the user A can use the "scan to mail" function of the MFP in the branch office without making any special settings when he/she visits the branch office.

(Example of Synchronization Setting Information Piece)

FIG. 13 is a drawing showing an example of a synchronization setting information piece stored in a synchronization setting information unit. The items shown in FIG. 13 are the same as those shown in FIG. 4 and are therefore not described herein.

(Specific Example of Network Synchronization)

A specific example of network synchronization is described below according to the second embodiment. In this example, the network synchronization system 1, including an information processing device A and an information processing device B, performs network synchronization between the information processing device A and the information processing device B. The information processing device A has personal setting information pieces (user-specific setting information pieces in the above-described personal setting information pieces) of a user 1 and a user 2, while the information processing device B has personal setting information pieces of the user 2 and a user 3.

Operations in this example are the same as those in the example of network synchronization of the above-described first embodiment except in that the setting information pieces are replaced by the personal setting information pieces, and therefore are not described in detail. A supplementary explanation is given below.

When the information processing device A performs network synchronization for synchronization of the personal setting information pieces between the information processing device A and the information processing device B, the personal setting information piece of the user 1 of the information processing device B is overwritten with that of the information processing device A while the personal setting information piece of the user 2 of the information processing device A is overwritten by that of the information processing device B. That is, between the information processing device A and the information processing device B, the personal setting information pieces are independently bidirectionally updated on a per user basis (or on a per personal setting information piece basis).

When synchronizing personal setting information pieces of plural users in this way, different users have different priority orders for synchronization.

(First Exemplary Synchronization Operation Performed by MFP 1001)

Figure 14:
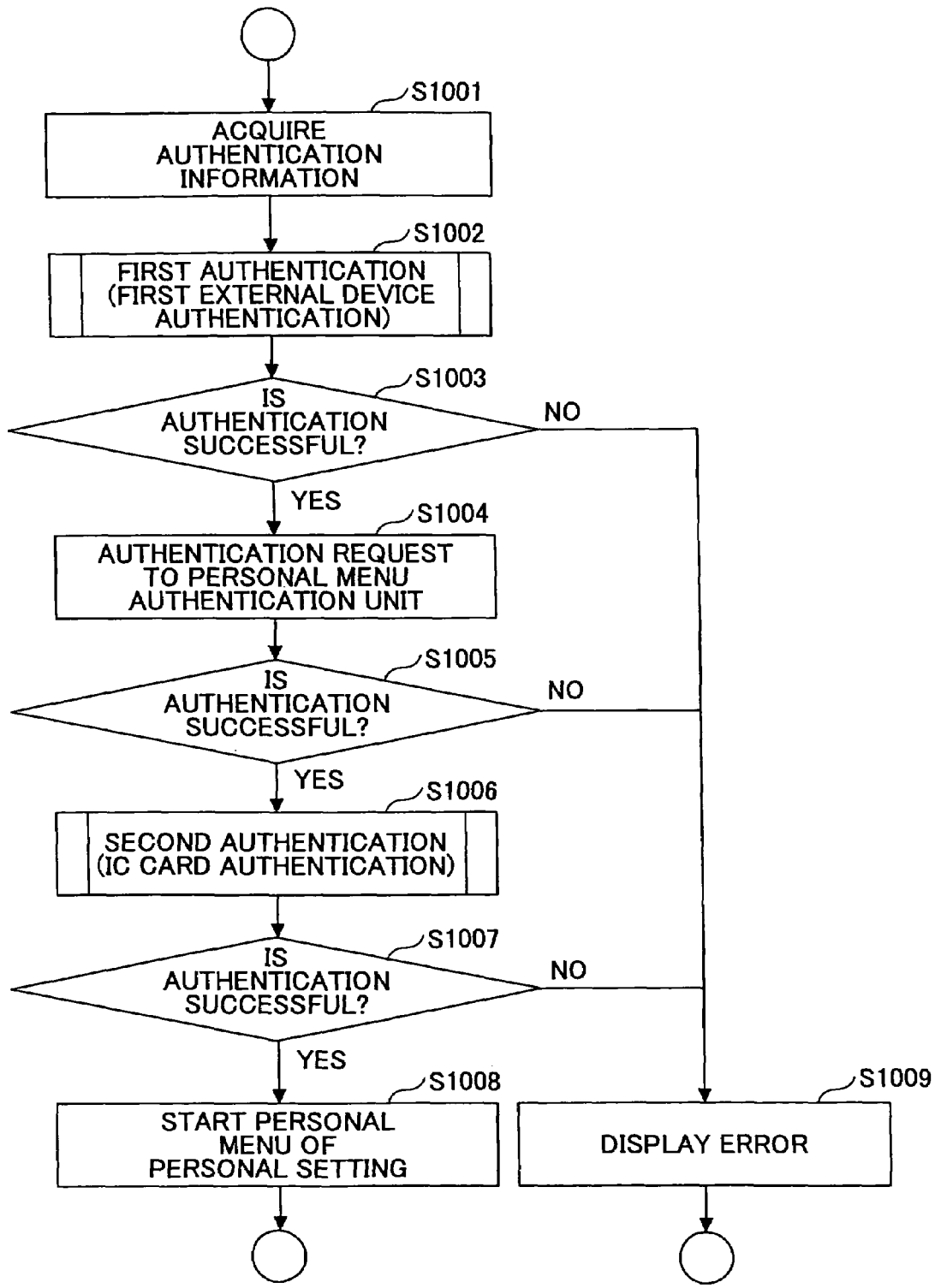
FIG. 14 is a flowchart illustrating a first exemplary synchronization operation performed by a digital color multifunction printer according to the second embodiment.

FIG. 14 is a flowchart illustrating a first exemplary synchronization operation performed by the MFP 1001 according to the second embodiment. The following describes, with reference also to the functional block diagram of FIG. 10, operations to be performed by the MFP 1001 in the case where network authentication and IC card authentication are selected in "first authentication" and "second authentication", respectively, in the personal menu authentication setting table of FIG. 11A.

First, an authentication information piece is acquired (Step S1001). In this Step S1001, the authentication information acquisition unit 1122 acquires the authentication information piece such as a user name and a password entered by the display input control unit 1110. Then in Step S1002 first authentication (authentication by the first external device 1003 in this example) is performed. In this Step, the control unit 1124 causes the network authentication determination unit 1126 to perform authentication according to the authentication setting information piece (in which network authentication is selected in the "first authentication") stored in the authentication setting information unit 1210. The first authentication is illustrated in detail in FIG. 16 and is therefore not described herein.

Then in Step S1003 it is determined whether the authentication is successful. In this step, the network authentication determination unit 1126 determines whether the first authentication performed in Step S1002 is successful. More specifically, the network authentication determination unit 1126 makes a determination by sending the authentication information piece acquired by in Step S1001 to the first external device 1003 via the first external device authentication control unit 1130 and receiving information indicating whether authentication based on the authentication information piece is successful from the first external device 1003.

If the authentication is determined to be successful in Step S1003 (Yes in Step S1003), the process proceeds to Step S1004. If the authentication is determined to be a failure (No in Step S1003), the process proceeds to Step S1009 in which an error indication is provided. Then the process ends.

In Step S1004, the personal menu authentication unit 1160 is requested to perform authentication (S1004). In this step, the control unit 1124 (common authentication control unit 1120) requests the personal menu authentication unit 1160 to perform authentication.

Then in Step S1005 it is determined whether the authentication is successful. In this step, in response to the authentication request of Step S1004, the personal menu authentication unit 1160 performs authentication using the user name and password acquired in Step S1001 and the authentication reference information piece stored in the personal setting information unit 1220. Thus, information related to the user who entered the authentication information piece in the MFP 1001 is selected (extracted) from the plural user data pieces in the authentication reference information table of FIG. 12A.

If the authentication is determined to be successful in Step S1005 (Yes in Step S1005), the process proceeds to Step S1006. If the authentication is determined to be a failure (No in Step S1005), the process proceeds to Step S1009 in which an error indication is provided. Then the process ends.

In Step S1006, second authentication (IC card authentication in this example) is performed. In this step the authentication information acquisition unit 1122 acquires an authentication information piece recorded in the IC card using the IC card reader 1045 (see FIG. 9). Further, the control unit 1124 causes the local authentication determination unit 1128 to perform authentication according to the authentication setting information piece (in which IC card authentication is selected in the "second authentication") stored in the authentication setting information unit 1210 The second authentication is illustrated in detail in FIG. 17 and is therefore not described herein.

Then in Step S1007 it is determined whether the authentication is successful. In this step the local authentication determination unit 1128 performs authentication using the authentication information piece acquired from the IC card in Step S1006 and information of the "IC card" in the row of the user in the authentication reference information table of FIG. 12A, which user is selected (extracted) as the user who entered the authentication information piece in the MFP 1001 in Step S1005. If there is no information in "IC card", the authentication reference information piece for authenticating the authentication information piece acquired from the IC card in Step S1006 may be registered.

If the authentication is determined to be successful in Step S1007 (Yes in Step S1007), the process proceeds to Step S1008. If the authentication is determined to be a failure (No in Step S1007), the process proceeds to Step S1009 in which an error indication is provided. Then the process ends.

In Step S1008, a personal menu of the personal setting is started. In this step the personal menu function execution unit 1170 starts a personal menu of the personal setting for the user who entered the authentication information piece in the MFP 1001.

With the above-described process, the MFP 1001 performs operations in the case where network authentication and IC card authentication are selected in the "first authentication" and the "second authentication", respectively, in the personal menu authentication setting table of FIG. 11A.

(Second Exemplary Authentication Operation Performed by MFP 1001)

Figure 15:
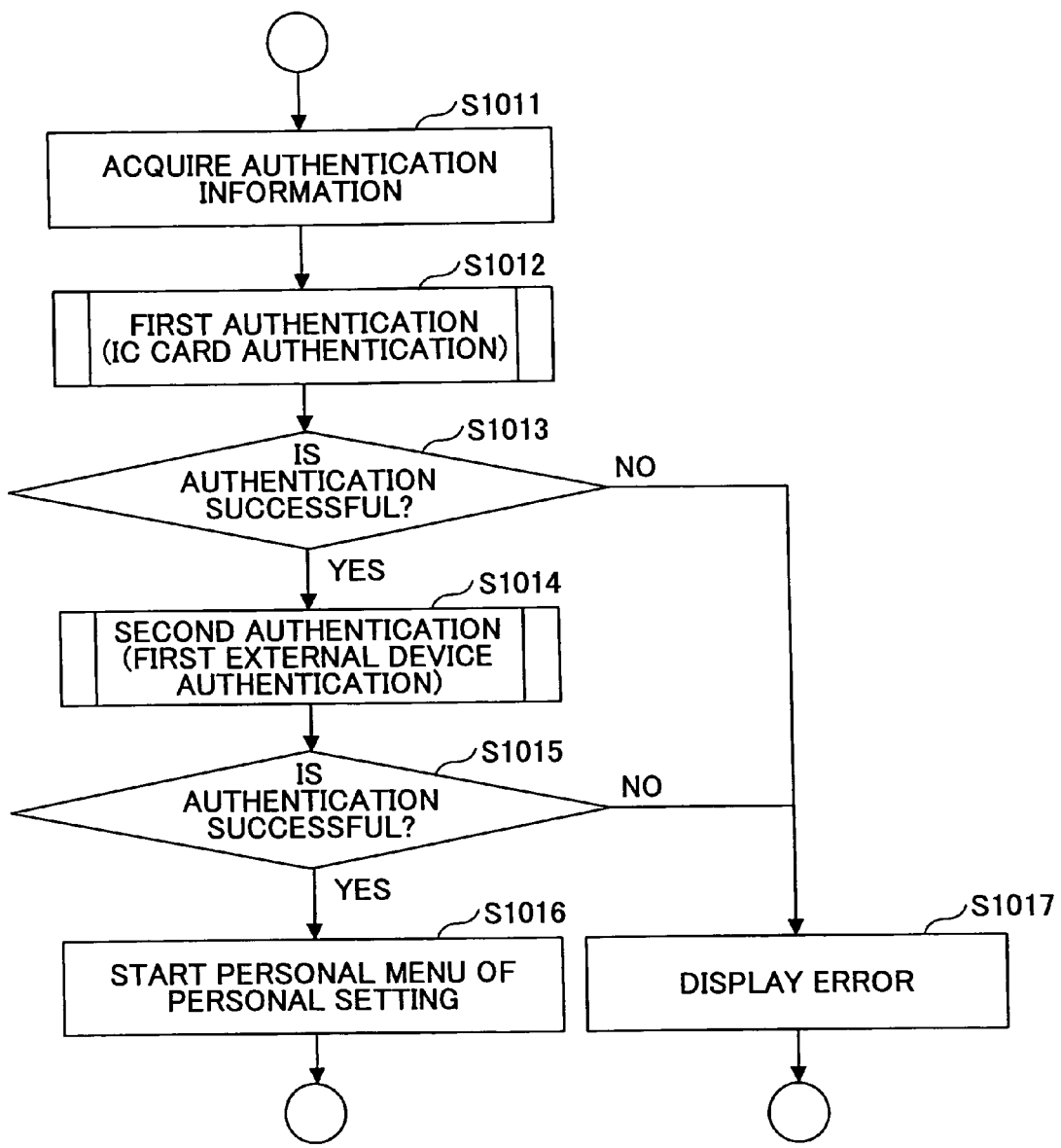
FIG. 15 is a flowchart illustrating a second exemplary synchronization operation performed by a digital color multifunction printer according to the second embodiment.
Figure 16:
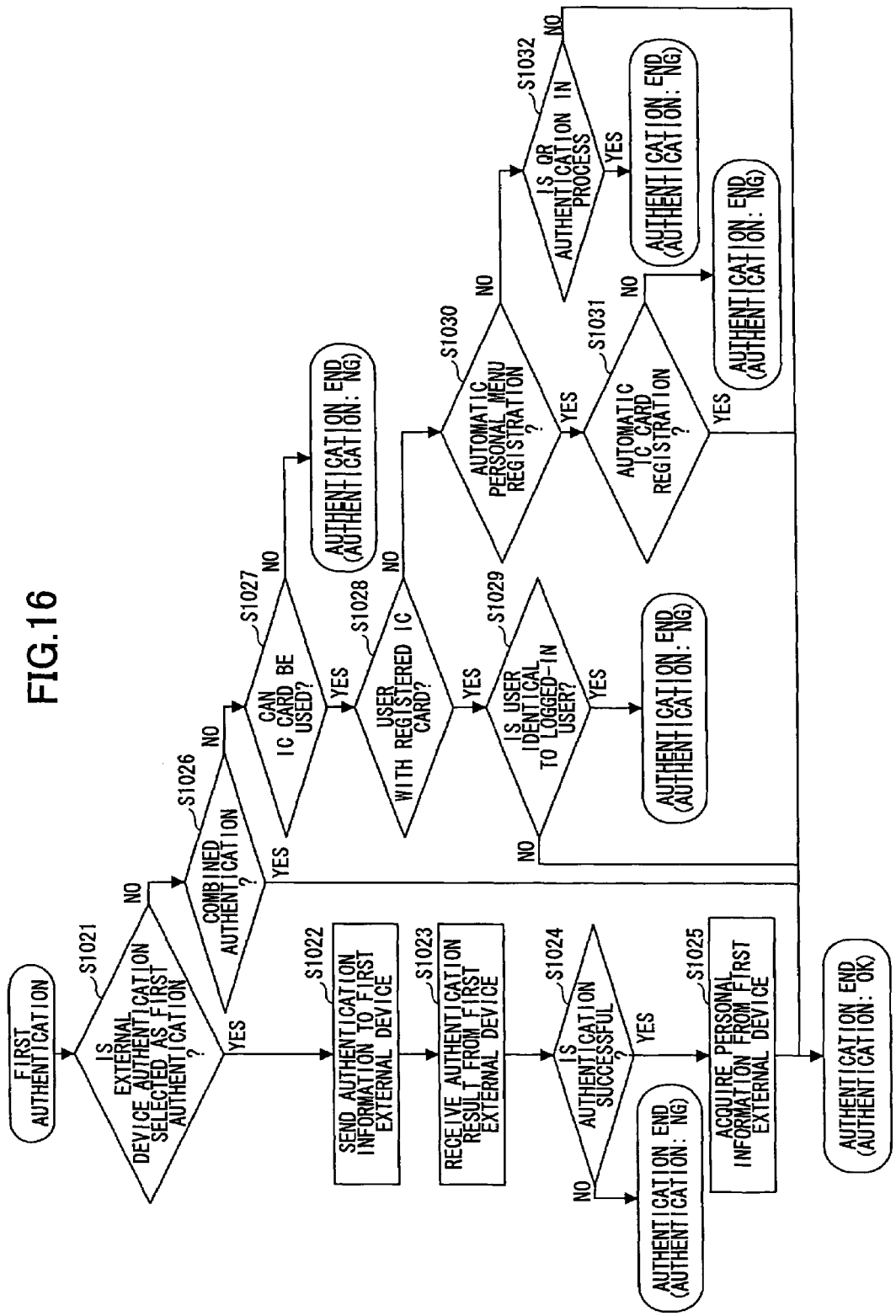
FIG. 16 is a flowchart illustrating an example of a first authentication performed by a digital color multifunction printer according to the second embodiment.
Figure 17:
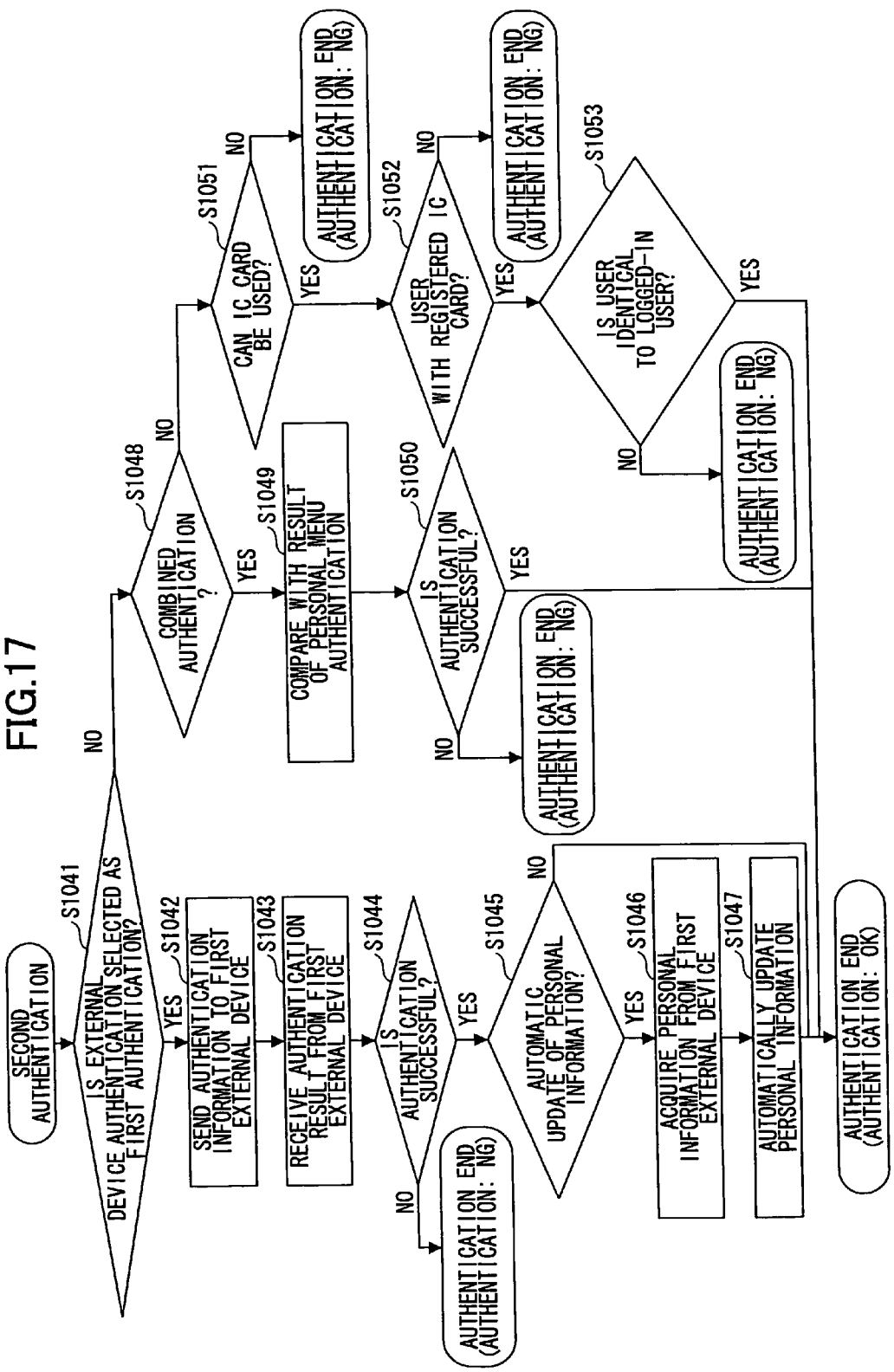
FIG. 17 is a flowchart illustrating an example of a second authentication performed by a digital color multifunction printer according to the second embodiment.

FIG. 15 is a flowchart illustrating a second exemplary synchronization operation performed by the MFP 1001 according to the second embodiment.

The following describes, with reference also to the functional block diagram of FIG. 10, operations to be performed by the MFP 1001 in the case where IC card authentication and network authentication are selected in the "first authentication" and the "second authentication", respectively, in the personal menu authentication setting table of FIG. 11A.

First, an authentication information piece is acquired (Step S1011). In this Step S1011 the authentication information acquisition unit 1122 acquires the authentication information piece recorded in the IC card using the IC card reader 1045 (see FIG. 9). Then in Step S1012 first authentication (IC card authentication in this example) is performed. In this step the control unit 1124 causes the local authentication determination unit 1128 to perform authentication according to the authentication setting information piece (in which IC card authentication is selected as the "first authentication") stored in the authentication setting information unit 1210. The first authentication is illustrated in detail in FIG. 16 and is therefore not described herein.

Then in Step S1013 it is determined whether the authentication is successful. In this step the local authentication determination unit 1128 determines whether the first authentication performed in Step S1012 is successful. More specifically, the local authentication determination unit 1001 determines whether authentication is successful by comparing the authentication information piece acquired by in Step S1011 with an authentication reference information piece stored in the personal setting information unit 1220. Thus, information related to the user who entered the authentication information piece in the MFP 1001 is selected (extracted) from the plural user data pieces in the authentication reference information table of FIG. 12A.

If the authentication is determined to be successful in Step S1013 (Yes in Step S1013), the process proceeds to Step S1014. If the authentication is determined to be a failure (No in Step S1013), the process proceeds to Step S1017 in which an error indication is provided. Then the process ends.

In Step S1014, second authentication (authentication by the first external device 1003 in this example) is performed. In this step the control unit 1124 performs, according to the authentication information piece (in which network authentication is selected in the "second authentication") stored in the authentication setting information unit 1210, using the information of the "first external user name" and the "first external device password" in the row of the user in the authentication reference information table of FIG. 12A, which user is selected (extracted) as the user who entered the authentication information piece in the MFP 1001 in Step S1011. More specifically, the network authentication determination unit 1126 sends the "first external device user name" and the "first external device password" to the first external device 1003 via the first external device authentication control unit 1130. The first external device 1003 performs authentication based on the received information and sends information indicating whether the authentication is successful to the network authentication determination unit 1126. The second authentication is illustrated in detail in FIG. 17 and is therefore not described herein.

Then in Step S1015 it is determined whether the authentication is successful. In this step the local authentication determination unit 1128 makes a determination using the information, received in Step S1015, indicative of whether the authentication is successful.

If the authentication is determined to be successful in Step S1015 (Yes in Step S1015), the process proceeds to Step S1016. If the authentication is determined to be a failure (No in Step S1015), the process proceeds to Step S1017 in which an error indication is provided. Then the process ends.

In Step S1016, a personal menu of the personal setting is started. In this step the personal menu function execution unit 1170 starts a personal menu of the personal setting for the user who entered the authentication information piece in the MFP 1001.

With the above-described process, the MFP 1001 performs operations in the case where IC card authentication and network authentication are selected in the "first authentication" and the "second authentication", respectively, in the personal menu authentication setting table of FIG. 11A.

With the above-described configuration, it is possible to simplify authentication operations even if plural users use the MFP 1001. Especially, in the case where many-users use the MFP 1001, when users are changed, authentication is performed based on authentication information acquired from an external storage medium, so that there is no need to enter authentication information for the first authentication using an operations unit every time users are changed. Furthermore, the risk of leaks of information can be reduced compared with authentication using user name and password.

Furthermore, because the MFP 1001 includes the first external device authentication control unit 1130, the server computer 1003 as an external device does not have to include such a first external device authentication control unit 1130. That is, the MFP 1001 can easily be added to the network without making changes to the functions of the external device.

Although the present invention is described with reference to the preferred embodiments, the present invention is not limited to these specific embodiments and may include any combination of features disclosed herein. Variations and modifications may be made without departing from the scope of the present invention.

The present application is based on Japanese Priority Applications No. 2007-169792 and No. 2008-068454 filed on Jun. 27, 2007 and Mar. 17, 2008, respectively, with the Japanese Patent Office, the entire contents of which are hereby incorporated herein by reference.

What is claimed is:

1. A network synchronization system comprising:
   at least first and second information processing devices, each one of the first and second information processing devices including
     a setting information storage unit configured to store a setting information piece of the information processing device;
     a synchronous shared-storage unit configured to duplicate the setting information piece of the information processing device stored in the setting information storage unit and store the duplicated setting information piece of the information processing device such that the duplicated setting information piece of the information processing device is shared by the other information processing device; and
     a synchronization control unit configured to update the setting information piece of the information processing device stored in the setting information storage unit to the setting information piece stored in the synchronous shared-storage unit so as to synchronize the setting information piece of the information processing device with that of the other information processing device,
   wherein for each of the first and second information processing devices
     the information processing device is configured to compare a setting information with a setting information stored in the other information processing device,
     the information processing device is configured to obtain the setting information stored in the other information processing device if the information processing device determines that the information processing device does not have the setting information stored in the other information processing device, and
     the information processing device is configured to obtain the setting information stored in the other information processing device if the information processing device determines that the information processing device has the setting information stored in the other information processing device, and that a last updated date of the setting information stored in the information processing device is older than that of the setting information stored in the other information processing device.

2. The network synchronization system as claimed in claim 1,
wherein the synchronization control unit is configured to
update the setting information piece of the information processing device stored in the synchronous shared-storage unit of the information processing device based on a comparison between the setting information piece of the information processing device stored in the synchronous shared-storage unit of the information processing device and a setting information piece of the other information processing device stored in a synchronous shared-storage unit of the other information processing device; and
update the setting information piece of the information processing device stored in the setting information storage unit of the information processing device based on the updated setting information piece stored in the synchronous shared-storage unit of the information processing device.

3. The network synchronization system as claimed in claim 1, wherein the setting information piece of the information processing device stored in the setting information storage unit of the information processing device includes a personal setting information piece of a user registered to use the information processing device.

4. The network synchronization system as claimed in claim 3, wherein the synchronization control unit is configured to update the personal setting information piece of the user of the information processing device stored in the synchronization shared-storage unit of the information processing device with a personal setting information piece of the same user stored in a synchronization shared-storage unit of the other information processing device if the personal setting information piece of the same user stored in the other synchronization shared-storage unit of the other information processing device is newer than the personal setting information piece of the user of the information processing device stored in the synchronization shared-storage unit of the information processing device based on a comparison between the personal setting information piece of the user of the information processing device stored in the synchronization shared-storage unit of the information processing device and the personal setting information piece of the same user stored in the synchronization shared-storage unit of the other information processing device.

5. The network synchronization system as claimed in claim 3, wherein the personal setting information piece includes a device-specific information piece specific to the information processing device.

6. The network synchronization system as claimed in claim 3, wherein the personal setting information piece includes a common setting information piece, which common setting information piece is common to the plural information processing devices and includes a setting information piece acquired from a server device, the server device being connected to the network synchronization system and configured to manage the common setting information piece.

7. The network synchronization system as claimed in claim 1 configured to allow, if authentication is successful, use of a function of the network synchronization system, further comprising:
an authentication information acquisition unit configured to acquire a first authentication information piece and a second information piece, different from the first authentication information piece, that are individually entered;
an authentication reference information storage unit configured to store a first authentication reference information piece for authenticating the first authentication information piece and a-second-authentication reference information piece for authenticating the second authentication information piece;
a first authentication determination unit configured to determine whether a first authentication using the first authentication information piece and the first authentication reference information piece is successful;
a second authentication determination unit configured to determine whether a second authentication using the second authentication information piece and the second authentication reference information piece is successful; and
an authentication information control unit configured to, if the first authentication and the second authentication are successful, store the second authentication reference information piece and the first authentication reference information piece in a manner associated with each other in the authentication reference information storage unit;
wherein the setting information piece of the information processing device stored in the setting information storage unit includes the first authentication reference information piece and the second authentication reference information piece stored in the authentication reference information storage unit.

8. An information processing device of a network synchronization system, the network synchronization system including a plurality of other information processing devices, the information processing device comprising:
a setting information storage unit configured to store a setting information piece of the information processing device;
a synchronous shared-storage unit configured to duplicate the setting information piece of the information processing device stored in the setting information storage unit and store the duplicated setting information piece of the information processing device such that the duplicated setting information piece of the information processing device is shared by at least a first device from among the plurality of other information processing devices; and
a synchronization control unit configured to update the setting information piece of the information processing device stored in the setting information storage unit based on the setting information piece stored in the synchronous shared-storage unit so as to synchronize the setting information piece of the information processing device with that of the first device,
wherein the information processing device is configured to compare a setting information with a setting information stored in the first device,
the information processing device is configured to obtain the setting information stored in the first device if the information processing device determines that the information processing device does not have the setting information stored in the first device, and
the information processing device is configured to obtain the setting information stored in the first device if the information processing device determines that the information processing device has the setting information stored in the first device, and that a last updated date of the setting information stored in the information processing device is older than that of the setting information stored in the first device.

9. The information processing device as claimed in claim 8, wherein the synchronization control unit is configured to
update the setting information piece of the information processing device stored in the synchronous shared-storage unit of the information processing device based on a comparison between the setting information piece of the information processing device stored in the synchronous shared-storage unit of the information processing device and a setting information piece of the other information processing device stored in a synchronous shared-storage unit of the other information processing device; and
update the setting information piece of the information processing device stored in the setting information storage unit of the information processing device based on the updated setting information piece stored in the synchronous shared-storage unit of the information processing device.

10. The information processing device as claimed in claim 8, wherein the setting information piece of the information processing device stored in the setting information storage unit of the information processing device includes a personal setting information piece of a user registered to use the information processing device.

11. The information processing device as claimed in claim 10, wherein the synchronization control unit is configured to update the personal setting information piece of the user of the information processing device stored in the synchronization shared-storage unit of the information processing device with a personal setting information piece of the same user stored in a synchronization shared-storage unit of the other information processing device if the personal setting information piece of the same user stored in the synchronization shared-storage unit of the other information processing device is newer than the personal setting information piece of the user of the information processing device stored in the synchronization shared-storage unit of the information processing device based on a comparison between the personal setting information piece of the user of the information processing device stored in the synchronization shared-storage unit of the information processing device and the personal setting information piece of the same user stored in the synchronization shared-storage unit of the other information processing device.

12. The information processing device as claimed in claim 10, wherein the personal setting information piece includes a device-specific information piece specific to the information processing device.

13. The information processing device as claimed in claim 10, wherein the personal setting information piece includes a common setting information piece, which common setting information piece is common to the plural information processing devices and includes a setting information piece acquired from a server device, the server device being connected to the network synchronization system and configured to manage the common setting information piece.

14. The information processing device as claimed in claim 8 configured to allow, if authentication is successful, use of a function of the network synchronization system, further comprising:
an authentication information acquisition unit configured to acquire a first authentication information piece and a second information piece, different from the first authentication information piece, that are individually entered;
an authentication reference information storage unit configured to store a first authentication reference information piece for authenticating the first authentication information piece and a second authentication reference information piece for authenticating the second authentication information piece;
a first authentication determination unit configured to determine whether a first authentication using the first authentication information piece and the first authentication reference information piece is successful;
a second authentication determination unit configured to determine whether a second authentication using the second authentication information piece and the second authentication reference information piece is successful; and
an authentication information control unit configured to, if the first authentication and the second authentication are successful, store the second authentication reference information piece and the first authentication information piece in a manner associated with each other in the authentication reference information storage unit;
wherein the setting information piece of the information processing device stored in the setting information storage unit includes the first authentication reference information piece and the second authentication reference information piece stored in the authentication reference information storage unit.

15. The network synchronization system according to claim 1, wherein the each one of the two information processing devices further includes:
a synchronization setting information unit configured to store a setting information of a synchronization, said setting information of the synchronization including an automatic synchronization interval obtained by calculating probability using random numbers based on a device unique number and a current time, and determining a next synchronization time based on a calculated synchronization interval X probability.

* * * * *